United States Patent [19]

Vukelic

[11] 4,052,912

[45] Oct. 11, 1977

[54] PEDAL ACTUATED DRIVE MECHANISM

[76] Inventor: Peter Vukelic, 924 Milwood Ave., Venice, Calif. 90291

[21] Appl. No.: 580,748

[22] Filed: May 27, 1975

[51] Int. Cl.² .............................................. G05G 1/14
[52] U.S. Cl. .................................... 74/512; 74/217 B; 115/21; 280/253
[58] Field of Search ................. 74/512, 781 B, 194, 74/199, 217 B, 230.01, 230.17; 280/253, 255, 258, 261; 115/21, 24.3

[56] References Cited

U.S. PATENT DOCUMENTS

| 354,337 | 12/1886 | Mercer | 280/258 |
|---|---|---|---|
| 418,963 | 1/1890 | Stoner | 280/258 |
| 446,670 | 2/1891 | Elliott | 280/255 |
| 514,198 | 2/1894 | Moehn et al. | 280/255 X |
| 540,686 | 6/1895 | Price | 280/253 X |
| 683,037 | 9/1901 | Gourny-Wysocki | 280/258 |
| 2,185,698 | 1/1940 | Wright | 280/253 X |
| 2,251,005 | 7/1941 | Rubinich | 280/258 |
| 3,877,724 | 4/1975 | Chase | 280/253 |

FOREIGN PATENT DOCUMENTS

| 2,953 of | 1886 | United Kingdom | 280/258 |
|---|---|---|---|
| 5,648 of | 1883 | United Kingdom | 280/260 |

Primary Examiner—Edgar W. Geoghegan
Attorney, Agent, or Firm—William P. Green

[57] ABSTRACT

A pedal actuated drive mechanism including two pedal structures to be actuated by the two feet of a user and preferably mounted to swing about an axis in two opposite directions, with the two pedals acting through a flexible cable or its equivalent to drive a bicycle wheel or other driven rotary unit through two one-way clutches each of which turns in a predetermined driving direction when a corresponding one of the pedals is pressed away from the user. Desirably the two cable lengths actuated by the two pedals respectively are interconnected for movement reversely with respect to one another, so that depression of the one pedal causes reverse movement of the other pedal. The effective power transmission ratio of the drive assembly can be varied by a controlled shifting of the points of connection of the flexible drive cable to the pedal structures to move those points of connection toward or away from the pivotal axes of the pedal structures, and thereby vary the effective lever arms of the pedal structures. Additionally, a control may shift the pedal elements themselves toward and away from their pivotal axes to attain another type of lever arm adjustment.

18 Claims, 40 Drawing Figures

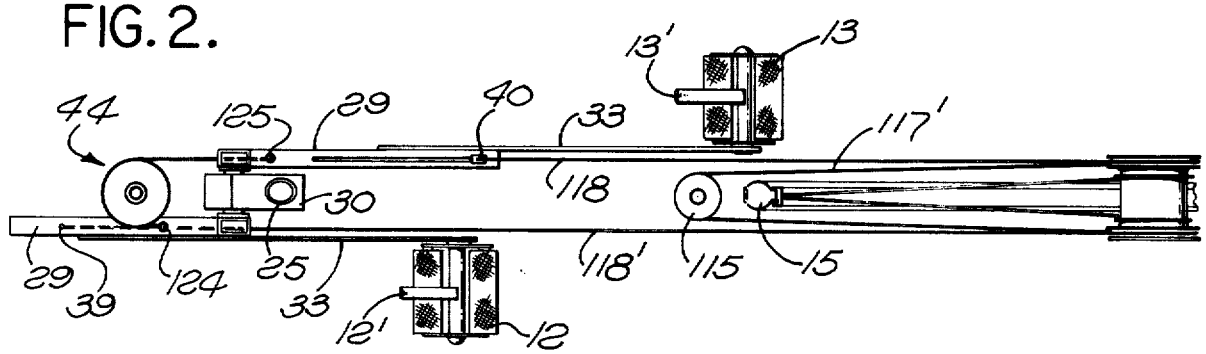
FIG. 2.
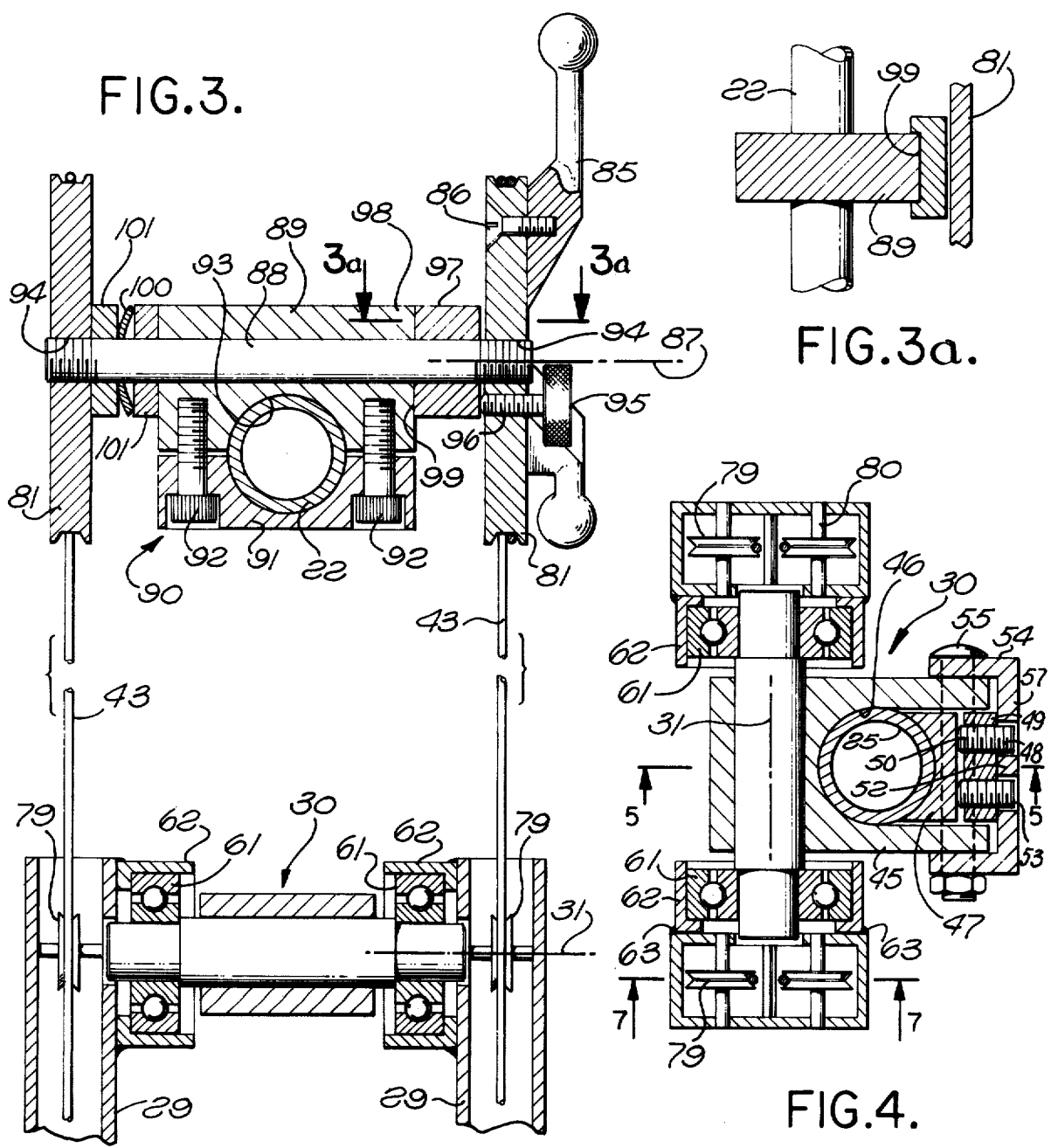
FIG. 3.
FIG. 3a.
FIG. 4.

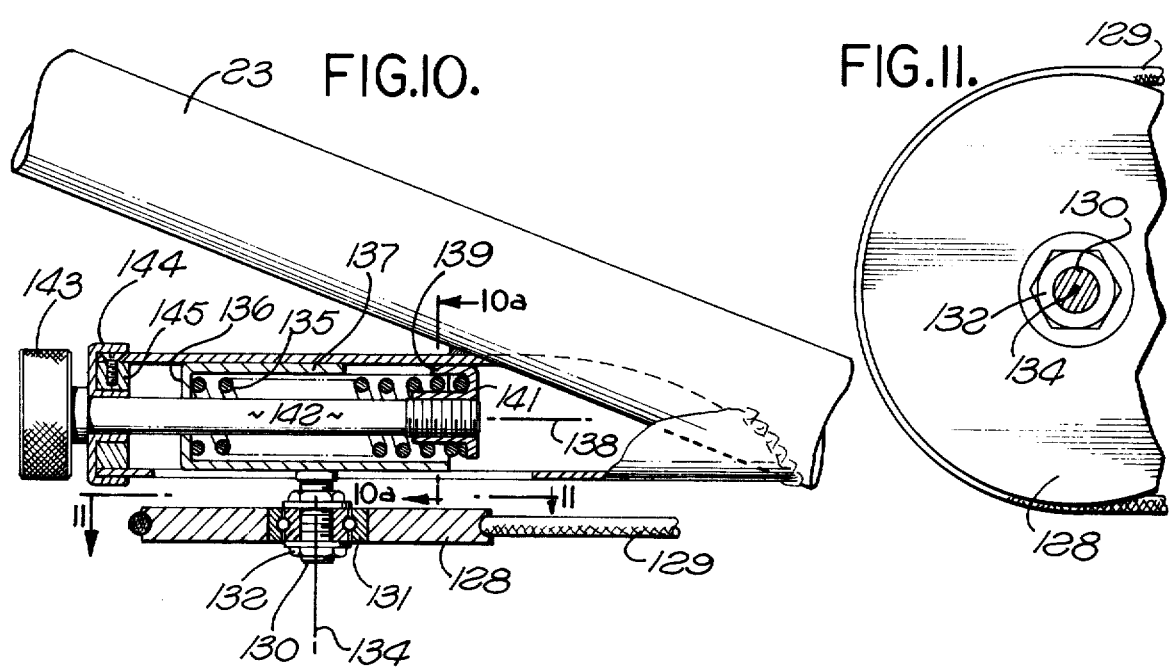
FIG.10.
FIG.11.
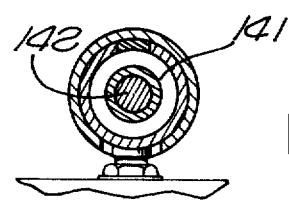
FIG.10a.
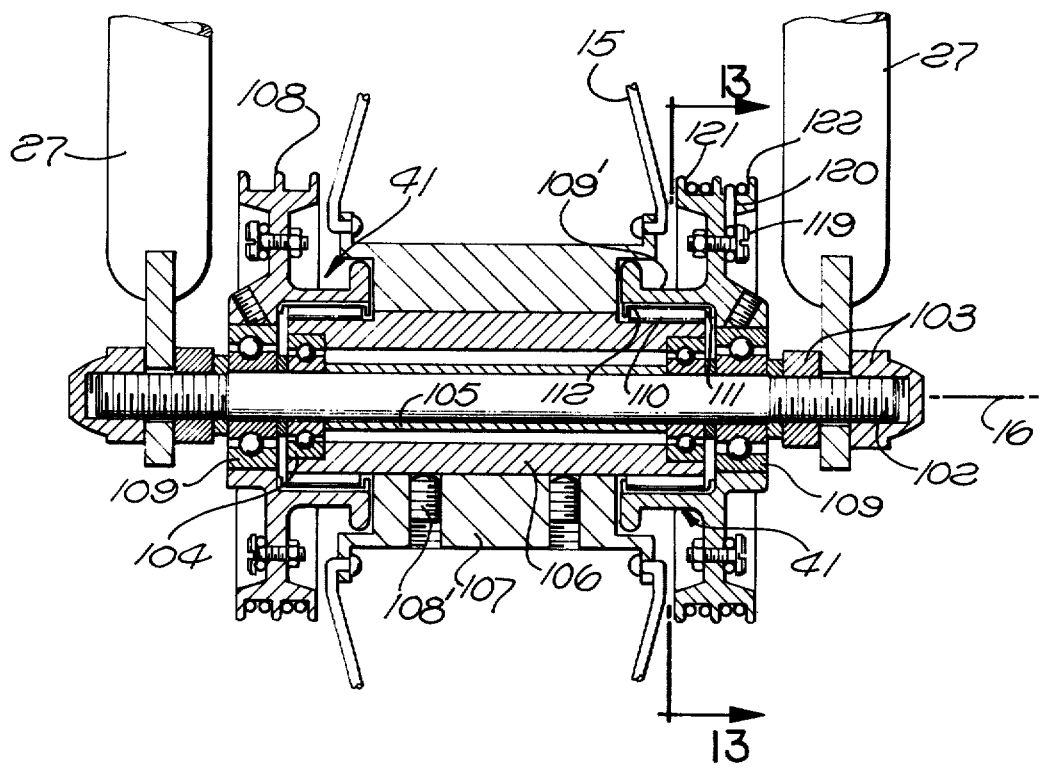
FIG.12.

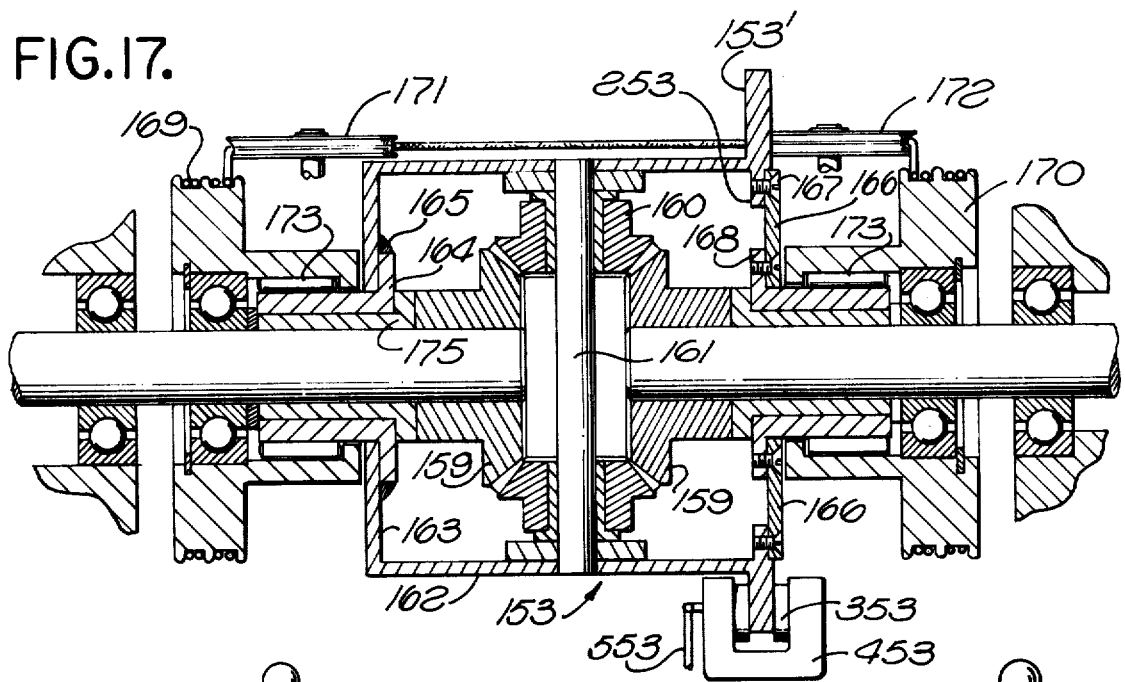
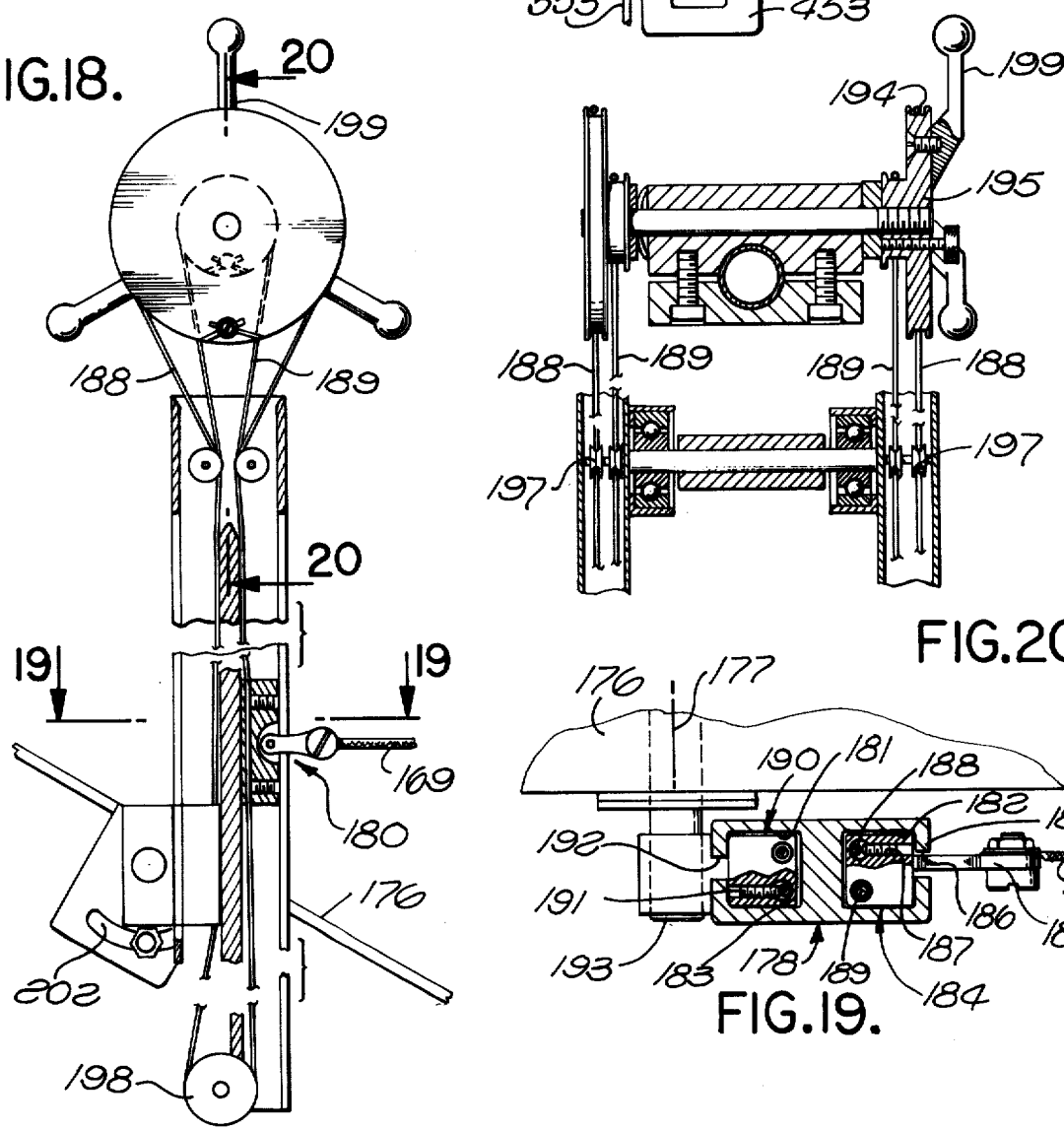

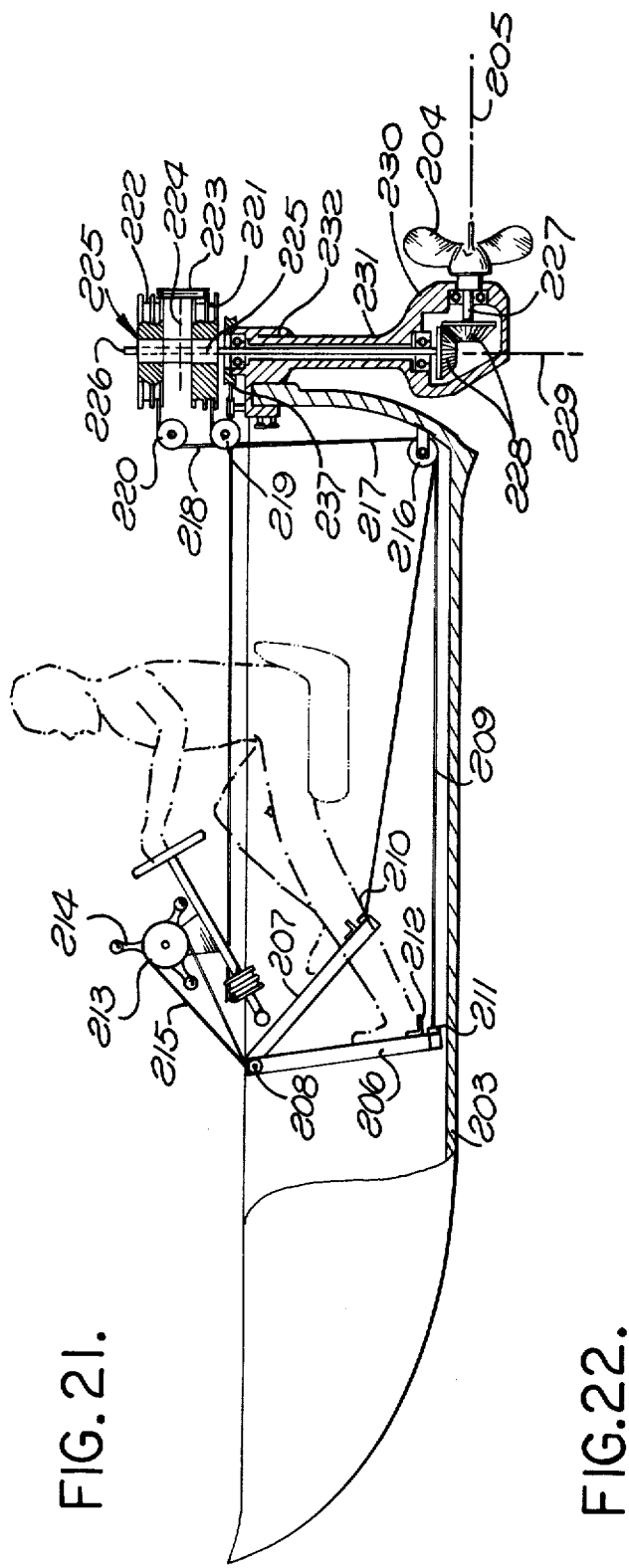
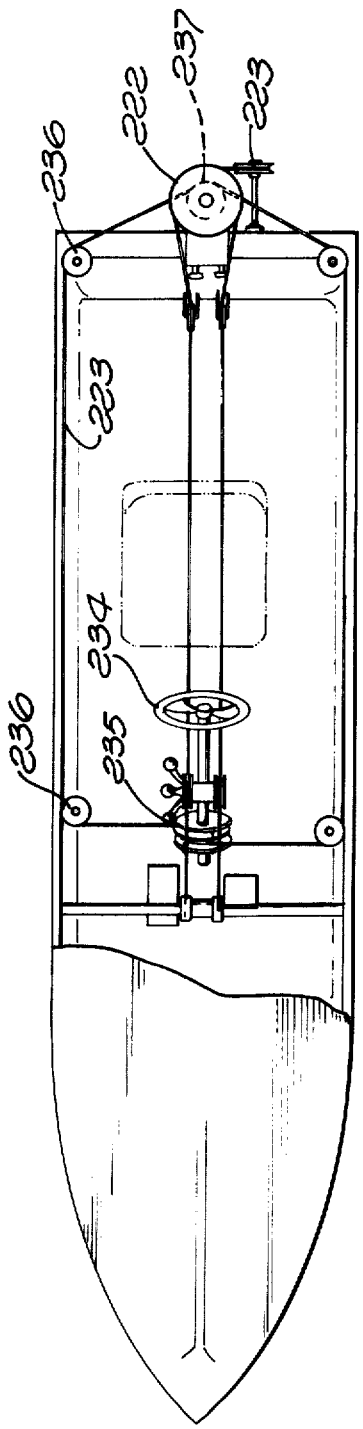
FIG. 21.
FIG. 22.

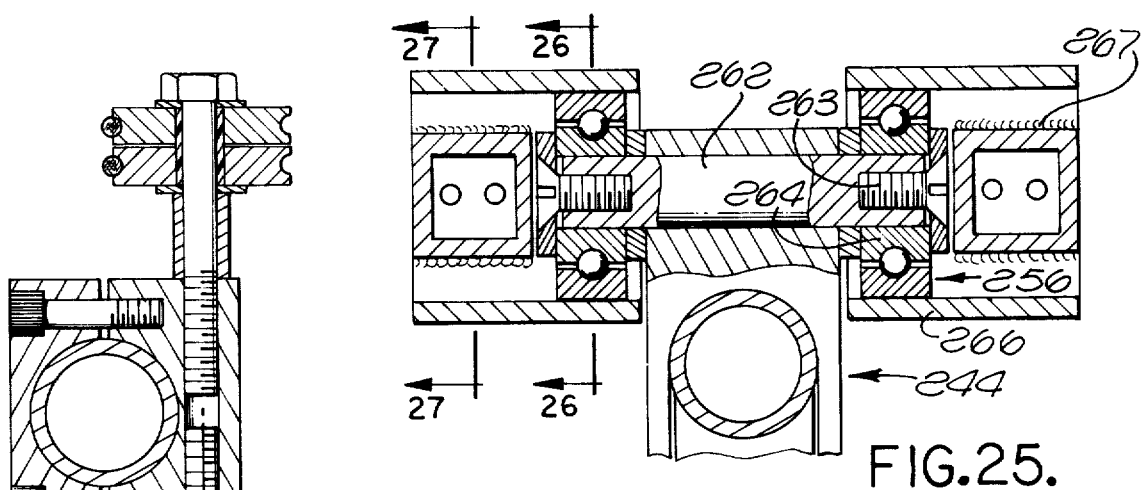
FIG.25.
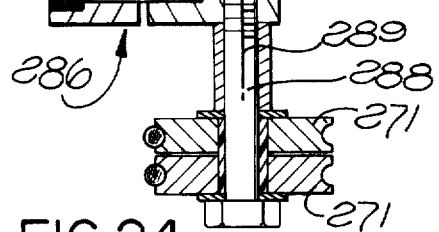
FIG.24.
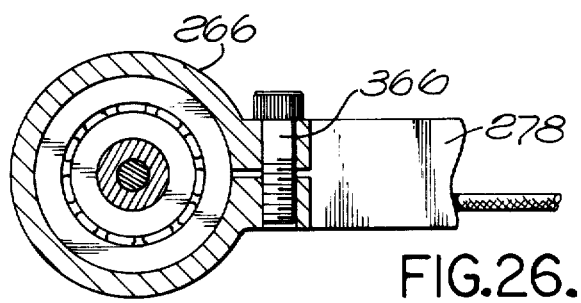
FIG.26.
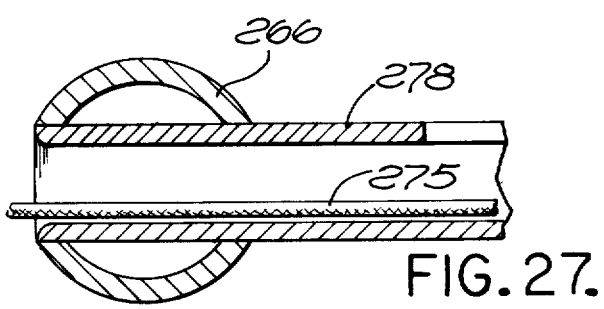
FIG.27.
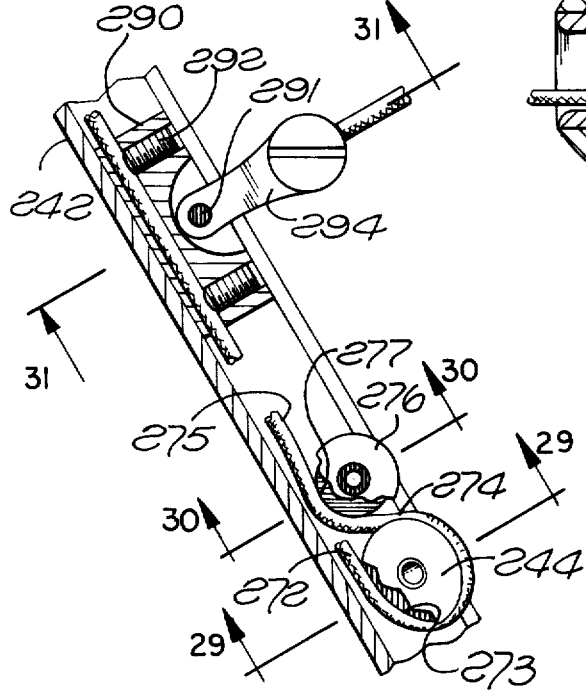
FIG.28.
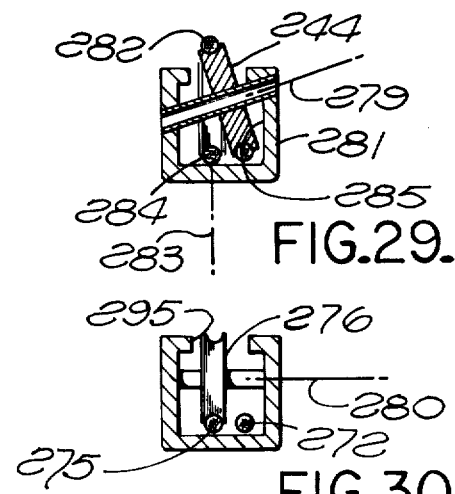
FIG.29.
FIG.30.

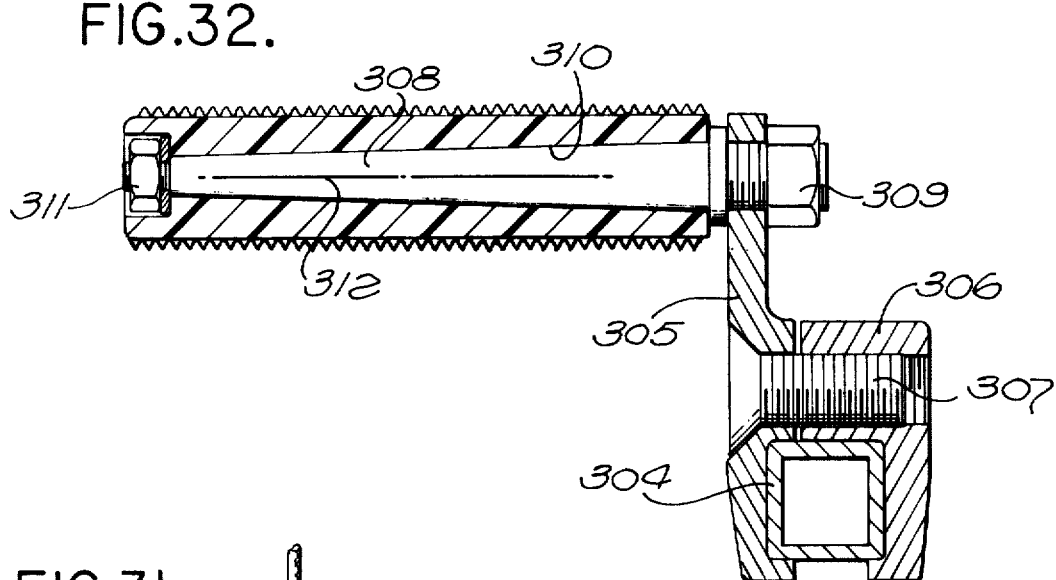
FIG.32.
FIG.31.
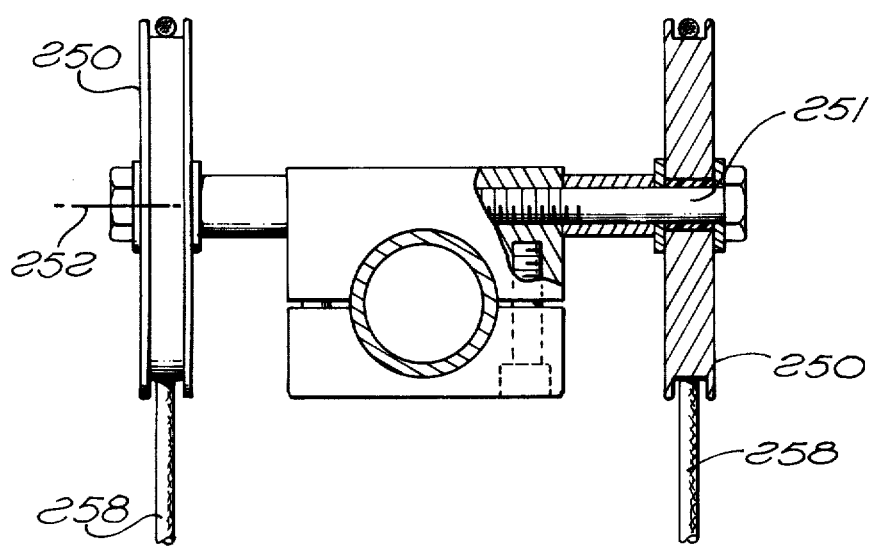
FIG.33.

PEDAL ACTUATED DRIVE MECHANISM

BACKGROUND OF THE INVENTION

This invention relates to improved pedal actuated drive mechanisms of a unique type adapted for use in driving a bicycle, tricycle, pedal powered car, boat, sewing machine, wheel chair, power tool such as a lathe or grinder, washing machine, or any of various other types of mechanism to which the apparatus may be adapted. Certain features of the invention have been shown in Disclosure Document No. 022010 filed in the United States Patent Office Sept. 4, 1973.

There have in the past been devised pedal actuated drive mechanisms in which two pedal structures are mounted to swing in opposite directions, and act by this oscillatory swinging movement to drive one or more vehicle wheels. In one such mechanism of which I am aware, two flexible cables extend rearwardly from the two pedal structures, and act through two one-way clutches to drive a pair of vehicle wheels through a transmission, with each clutch exerting torque in a predetermined driving direction when the corresponding pedal is pressed by the user, and with the cable and pedal being spring returned in an opposite retracting direction when the foot pressure is released. One disadvantage of this type of mechanism resides in the fact that on each active stroke of a pedal extra force must be exerted to overcome the torque of the retracting spring, and consequently the mechanism is not as efficient as would be desired. Further, this prior device has required a fairly complex and expensive transmission in order to alter the effective transmission ratio of the overall system. As a result, the cost of the assembly has been more than would be desired in a motorless vehicle.

SUMMARY OF THE INVENTION

The present invention provides an improved foot actuated drive assembly which may be of the above discussed general type but is specifically constructed to overcome the mentioned disadvantages of prior similar arrangements. For one thing, a system embodying the invention avoids the necessity for the pedal retracting springs, by interconnecting the two pedal assemblies in a manner causing retraction of one pedal in response to foot actuated advancement of the other pedal, and utilizing the two oneway clutches for attaining together an almost continuous driving action against the driven wheel of wheels. Structurally, this is accomplished by providing a connection between the two lengths of cable or other flexible material which drive the clutches from the pedals respectively. This connection interconnects these two lengths for movement reversely with respect to one another, and may take the form of a simple flexible cable or element extending between the locations of the two clutches and extending about idler means in a relation attaining the desired reverse drive. In one form of the invention, a single elongated flexible assembly extends rearwardly from one pedal and then about a drive element of a first of the one-way clutches, then about the discussed idler means and to the second one-way clutch, and then back forwardly to the second pedal. In other arrangements, it is comtemplated that the equivalent of this assembly may be formed from a number of flexible elements or connectors which act together to interconnect two pedals for reverse oscillatory movement and drive the two clutches in response to forward movement of the two pedals respectively.

One very important feature of the invention involves a unique arrangement which adapts the pedal actuated drive assembly for adjustment to conditions having any of various different effective transmission ratios, but with an extremely simple mechanism of rugged and reliable construction. To achieve this result, I provide for controlled shifting movement of the points of connection of the flexible drive elements to the pedal structures in a manner allowing those points of connection to be moved toward or away from the pivotal axes about which the pedal structures swing. In this way, the effective lever arm of the pedal structures with respect to the driven elements is altered in controlled fashion, to produce a corresponding change in the effective transmission ratio of the system. I may also attain a different type of change in transmission ratio by shifting movement of the pedal elements themselves toward or away from the pivotal axes about which they swing. Either or both of these types of control may be utilized in a particular assembly, preferably both in combination in order to maximize the adjustment attainable in a small space. Control means actuable by a user may shift the discussed points of connection and/or the pedal elements through an infinite number of effective transmission ratios. In an optimum arrangement, a single control element can simultaneously shift the discussed points of connection in one direction relative to the pivotal axes of the pedals, while the pedal elements shift in the opposite direction.

BRIEF DESCRIPTION OF THE DRAWINGS

The above and other features and objects of the invention will be better understood from the following detailed description of the typical embodiments illustrated in the accompanying drawings, in which:

FIG. 2 is a fragmentary plan view of certain of the working parts of the drive system of FIG. 1, and taken on line 2—2 of FIG. 1;

FIG. 3 is a enlarged section on line 3—3 of FIG. 1;

FIG. 3a is a section on line 3a—3a of FIG. 3,

FIG. 4 is an enlarged section on line 4—4 of FIG. 1;

FIG. 10a is an enlarged vertical section through a forward portion of the drive system of FIG. 1;

FIG. 10 is a section on line 10a—10a of FIG. 10;

FIG. 11 is a fragmentary plan view of the two idler pulleys of FIG. 10, taken on line 11—11 of FIG. 10;

FIG. 12 is an enlarged fragmentary vertical section through the rear wheel axis taken on line 12—12 of FIG. 1;

FIG. 17 is an enlarged fragmentary vertical section taken on line 17—17 of FIG. 16;

FIG. 18 is an enlarged vertical section taken through one of the pedal crank arms and associated control mechanism of FIG. 15;

FIG. 19 is a view taken on line 19—19 of FIG. 18;

FIG. 20 is a vertical section taken on line 20—20 of FIG. 18;

FIG. 21 is a side view of another variational drive system embodying the invention and adapted for driving a boat;

FIG. 22 is a plan view of the FIG. 21 arrangement;

FIGS. 24 and 25 are enlarged sections taken on lines 24—24 and 25—25, respectively, of FIG. 23;

FIGS. 26 and 27 are sections taken on lines 26—26 and 27—27 of FIG. 25;

FIG. 28 is an enlarged fragmentary vertical section through a portion of one of the crank arms of FIG. 23;

FIGS. 29, 30 and 31 are sections taken on lines 29—29, 30—30, and 31—31, respectively, of FIG. 28; and FIG. 32 is a section through one of the pedals, taken on line 32—32 of FIG. 23.

FIG. 33 is an enlarged section taken on line 33—33 of FIG. 23;

DESCRIPTION OF THE PREFERRED EMBODIMENTS

Figure 1:
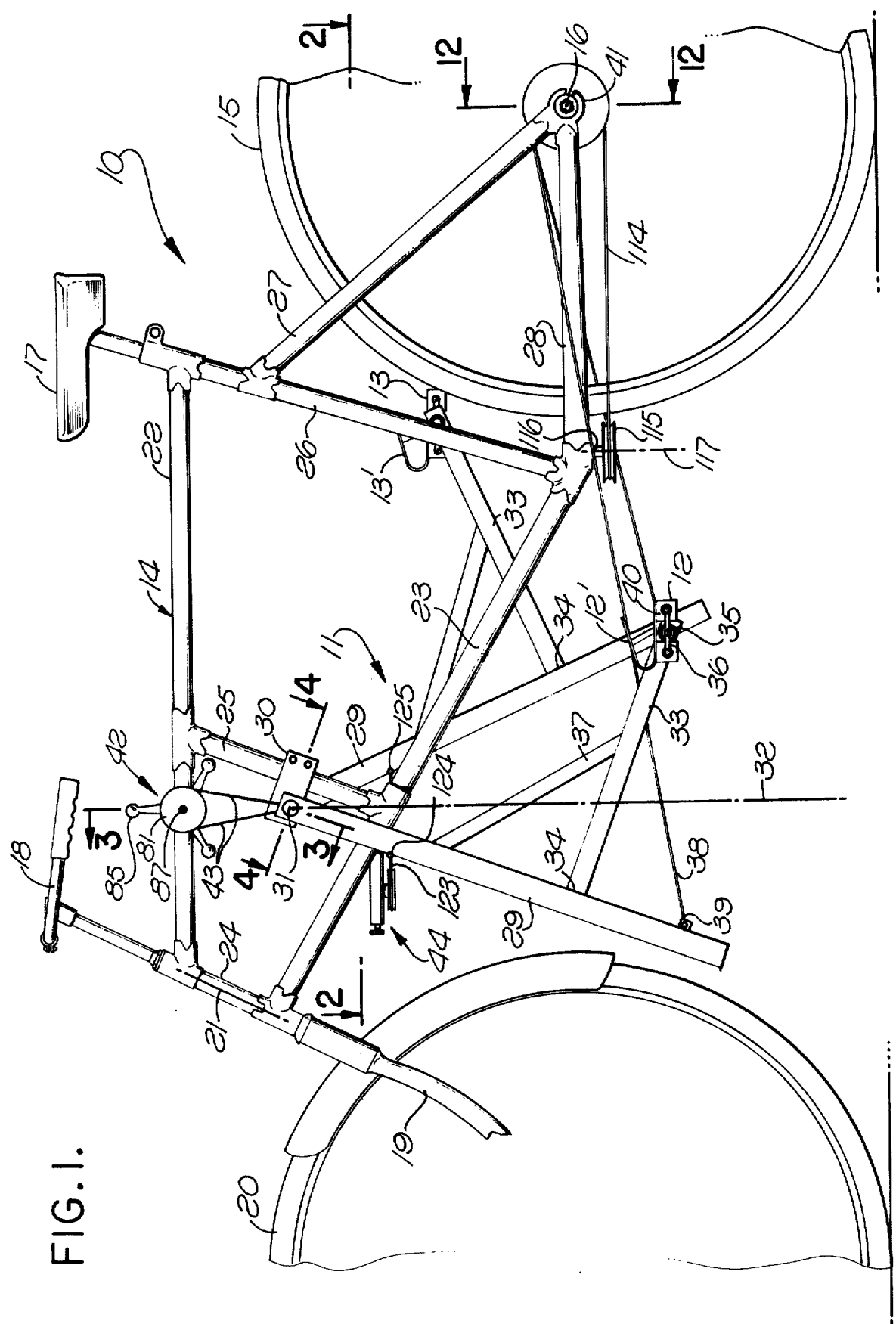
FIG. 1 is a side view of a bicycle having a first form of drive system embodying the invention.

Referring first to FIG. 1, I have represented at 10 a bicycle having a drive system 11 which is actuated by two pedals 12 and 13 at opposite sides of the frame 14 of the bicycle to drive the rear wheel 15 about its horizontal axis 16 relative to the frame. The rider may sit on a conventional seat 17, and steer the bicycle through the usual handlebars 18 which turn fork 19 and the carried forward wheel 20 about steering axis 21 relative to the frame. The frame preferably includes a horizontal top member 22, an inclined lower member 23, three angularly disposed members 24, 25 and 26 extending between members 22 and 23, and the usual elements 27 and 28 projecting rearwardly from member 26 at opposite sides of rear wheel 15 to mount that wheel for rotation about its axis 16.

The drive mechanism 11 embodying the invention includes two crank arms 29 which carry the two pedals 12 and 13 respectively and which are mounted by a bracket 30 for swinging movement with the pedals about a common horizontal axis 31 extending parallel to rear wheel axis 16. In FIG. 1, the left crank arm and left pedal 12 are shown in their forwardmost position, and the right crank arm and right pedal 13 are shown in their rearmost position. Each pedal is desirably mounted to its associated crank arm 29 in a manner to be at all times received substantially behind a vertical plane 32 containing axis 31; so that the pedals may have a very substantial vertical movement and be actuated by downward force exerted by the rider. For this purpose, each pedal may be connected to its carrying crank arm 29 by a member 33 extending perpendicular to the crank arm 29 and rigidly welded or otherwise connected thereto at the forward end 34 of element 33, with the pedal 12 or 13 being mounted rotatably on a conventional pedal shaft 35 projecting outwardly from the rear end of element 33, so that the pedal can turn freely about a horizontal axis 36. A rigid brace 37 may extend angularly between each arm 29 and the associated member 33, and be welded or otherwise rigidly secured at its opposite ends to these parts, to assist in maintaining the pedal at a fixed location relative to arm 29.

The discussed swinging movement of crank arms 29 drives rear wheel 15 through an elongated essentially unstretchable cable 38, which is movably connected at its opposite ends 39 and 40 to the two arms 29 respectively, and which drives wheel 15 through two one-way clutches 41 at opposite sides of the wheel. The effective lever arm of cranks 28 is adjustable by shifting the ends 39 and 40 of cable 38 upwardly and downwardly along arms 29, by means of a manually actuated control unit 42 acting through a pair of cables 43 which extend downwardly into arms 29. A mechanism 44 connects arms 29 at their forward sides in a relation coacting with cable 38 in assuring movement of the two arms 29 in correspondence with one another but reversely with respect to one another.

Figure 5:
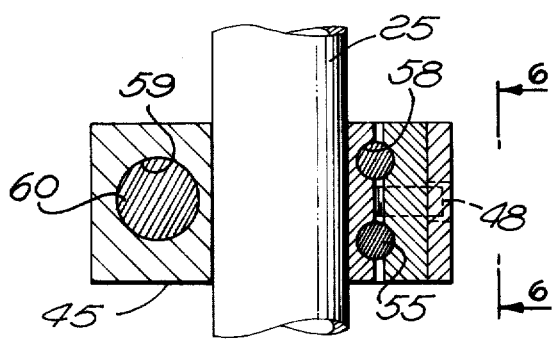
FIGS. 5, 6 and 7 are sections taken on lines 5—5, 6—6 and 7—7 of FIGS. 4, 5 and 4 respectively.
Figure 6:
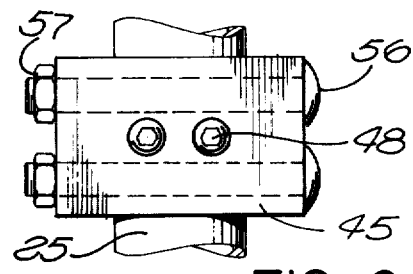

As best seen in FIGS. 4 to 6, the clamp or bracket 30 which mounts arms 29 for their swinging movement preferably includes a main clamp body 45 containing a recess 46 with a semi-cylindrically curved portion for embracing one side of the tubular bicycle frame element 25. A complementary cylindrically curved clamping element 47 is engageable against the opposite side of frame element 25, and is tightened thereagainst by two screws 48 threadedly connected into a carrier member 49 and bearing against part 47 at 50. Part 49 may in turn be backed up against rightward movement in FIG. 4 by a channel shaped part 51, having a portion 52 against which part 49 bears and which contains two apertures 53 through which screws 48 are accessible for tightening by a tool. Part 51 has two flanges 54 received at opposite sides of member 45, and secured thereto by a pair of bolts 55 extending entirely through both of these parts and having heads 56 at one end and nuts 57 at their opposite end. As seen best in FIG. 5, the two parts 47 and 49 may contain complementary semi-circular grooves or recesses 58 receiving the two bolts 55.

At the forward side of frame element 25, the main clamp part 45 contains a cylindrical transverse passage 59 within which an externally cylindrical shaft 60 is received, desirably in pressed fit relation to rigidly retain the shaft in fixed position relative to member 45. Shaft 60 is centered about the previously mentioned horizontal axis 31, and has its opposite ends projecting in opposite directions beyond the clamp to carry a pair of ball bearings 61 which mount pedal crank arms 29 for their swinging movement about axis 31. The inner races of bearing 61 may be fixed relative to the shaft, desirably being pressed fits thereon, while the outer races of the bearings are fixed relative to a pair of annular parts 62 rigidly secured to the upper ends of arms 29, as by welding at 63.

Figure 7:
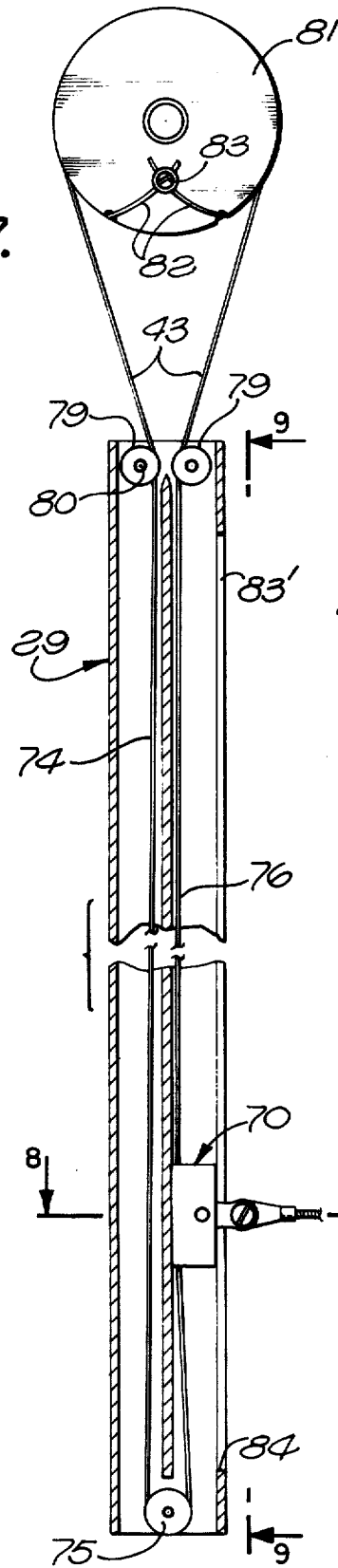
Figure 9:
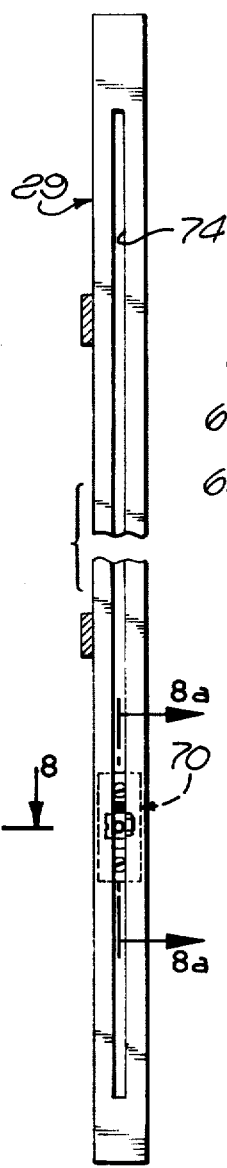
FIG. 9 is a rear view of the pedal crank arm taken on line 9—9 of FIG. 7.
Figure 8:
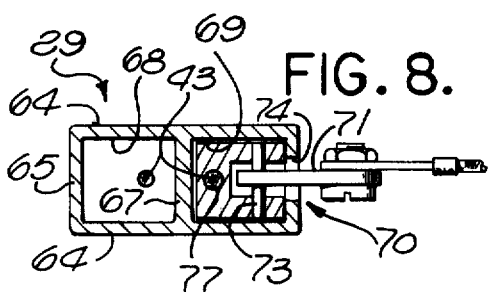
FIG. 8 is an enlarged section on line 8—8 of FIG. 7.
Figure 8A:
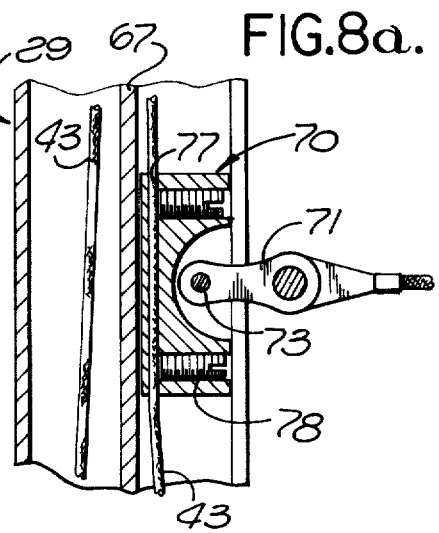
FIG. 8a is a section on line 8a—8a of FIG. 9.

With reference now to FIGS. 7, 8 and 9, each of the crank arms 29 may have an essentially rectangular cross-section as seen in FIG. 8, defined by two vertical planar opposite side walls 64 lying in vertical planes perpendicular to axes 16 and 31, and two front and rear walls 65 and 66 perpendicular to the side walls 64. An intermediate divider 67 parallel to walls 65 and 66 divides the interior of the hollow arm 29 into two elongated front and rear passageways 68 and 69. The rear one of these passageways acts as a guideway for mounting a block 70 for sliding movement upwardly and downwardly along arm 29. This block 70 is shaped in correspondence with passageway 69 and slidably received therein. The ends 39 and 40 of cable 38 are connected to the blocks 70 carried by the two arms 29 respectively through vertically elongated slots 74 in walls 66, as by transverse pins 73 extending transversely through blocks 70 and through a pair of connectors 71 attached to the cables. Thus blocks 70 connect the ends of cable 38 to arms 29 in a relation allowing upward and downward shifting movement of the points of connection toward and away from axis 31.

The blocks 70 are controllably shifted upwardly and downwardly by two identical endless essentially non-stretchable cables 43 which are connected to these blocks 70 in the relation illustrated in FIG. 7. More particularly, each of these cables 43 has a first run 74 extending downwardly within forward passageway 68 in the corresponding arm 29, and then extends about an idler pulley 75 mounted rotatably to the lower end of arm 29, to form a second run 76 of the cable extending upwardly within rear passageway 69 in arm 29. This run 76 has a portion which extends through a passage 77 in block 70 (FIGS. 7 and 8), and is tightenable against the forward wall of that passage by a pair of set screws 78 threadedly connected into part 70. These set screws thus secure block 70 rigidly to a particular portion of cable 43, to be moved upwardly and downwardly along arm 29 by endless movement of that cable. At the upper end of arm 29, the two runs of the cable are received between and guided by a pair of upper idler rollers or pulleys 79, which are mounted rotatably to arm 29 by pins 80 to turn about horizontal axes parallel to axes 16 and 31.

At its upper end, each of the two cables 43 extends about an upper pulley 81, to be moved longitudinally by rotation of that pulley. Each cable 43 functions essentially as an endless cable, except that it preferably is rigidly secured to the associated pulley 81 to maintain that pulley in a fixed relationship to the block 70 which is actuated by the cable. For this purpose, cable 43 may have two upper ends which extend about pulley 81 in opposite directions, and have terminal portions 82 securely retained in fixed positions to pulley 81, as by retaining screws 83. The cable ends extend about pulley 81 through a sufficient number of turns to enable rotation of pulley 81 through enough turns to shift blocks 70 through their entire range of vertical movement relative to arms 29, that is through the entire distance between the upper and lower ends 83' and 84 of slot 74.

The two pulleys 81 form portions of the previously mentioned control assembly 43, which also includes a number of circularly spaced actuating handles 85 (typically three such handles) secured to one of the pulleys 81, as by screws 86 (FIG. 3). Pulleys 81 are connected together for rotation in unison about a common horizontal axis 87 parallel to axis 31 by a horizontal shaft 88, journaled rotatably within a main uppersection 89 of a clamping assembly 90. The lower section 91 of this clamping assembly is tightenable upwardly relative to section 89 by screws 92 to tightly clamp a portion of horizontal frame element 22 of the bicycle within complimentary semi-cyclindrical recesses 93 in the clamp parts. Pulleys 81 are secured rigidly to opposite ends of shaft 88, as by threaded connections at 94 and appropriate set screws or other locking means for preventing rotation of the pulleys relative to the shaft. The pulleys 81 may be locked in any desired set rotary position, by manual tightening of a lock screw 95, threadedly connected into one of the pulleys at 96, and bearing against a rigid ring 97 disposed about the shaft. The engagement between ring 97 and part 89 at 98 may either be a simple frictional engagement, or an interfitting engagement positively preventing rotation of ring 97 relative to part 89, as by formation of ring 97 to have a diametrical groove 99 receiving an edge portion of part 89 (FIG. 3a) in a relation locking these parts against relative rotation. At the opposite side of part 89, there may be provided an annular spring 100, between two washers 101, for urging the pulleys 81 and shaft 88 leftwardly in FIG. 3. When a rider turns screw 95 in a locking direction, this tightening first moves the pulleys to the right in FIG. 3, to take up the play provided by spring 100, and against the tendency of spring 100, and then clamps all the parts axially against one another in a relation locking the pulleys 81 against rotation and retaining the ends 39 and 40 of cable 38 in predetermined set positions along crank arms 29.

FIG. 12 shows the clutch mechanism which is provided at the axle of the rear wheel. As previously indicated, that mechanism includes two one-way clutches 41 which are located at opposite sides of the rear wheel 15, and both of which are adapted to drive the wheel in a forward direction but not in the reverse rear direction. The axle of the rear wheel is represented at 102, and has its opposite ends connected in the usual manner to the frame elements 27 and 28 by nuts 103. Two ball bearings 104 separated by a tubular spacer 105 disposed about the axle have their outer races received within counterbores in a tubular part 106, to mount that part for rotation about axis 16. A hub portion 107 of the wheel 5 is received about tubular part 106, and locked in fixed position relative thereto by set screws 108 threadedly carried by hub 107 and tightenable inwardly against part 106. In addition to the set screws, these parts may also be appropriately keyed or splined to prevent relative rotation thereof.

Figure 13:
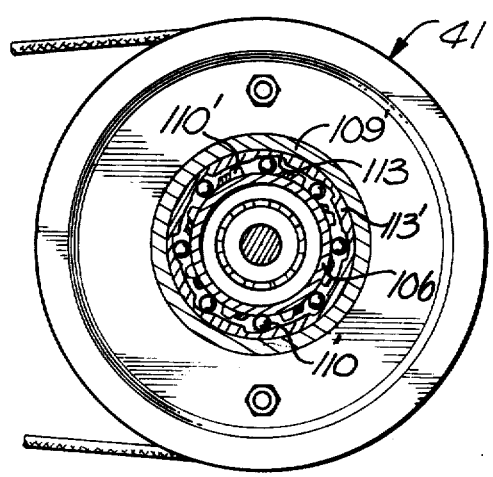
FIG. 13 is a transverse vertical section taken on line 13—13 of FIG. 12.

At opposite sides of the wheel, the mechanism of FIG. 12 includes two pulley wheels 108, which are enaged by the cable 38, and which are mounted by a second pair of bearings 109 for rotation about axis 16 relative to the axle. Each of these wheels 108 has an inwardly projecting annular portion 109' forming a part of one of the one-way clutches 41, and coacting with a series of roller type clutch elements 110 located by a retainer 110' disposed about part 106. Rollers 110 at their inner sides contact and roll along the outer cylindrical surface of part 106, and at their radially outer sides engage camming ramp surfaces 113 (FIG. 13) formed in a liner 113' fixed to and within portion 109' of element 108, in a relation acting in known manner to cam the rollers inwardly against part 106 when part 108 is driven in a forward rotary direction, but releasing the frictional drive engagement when part 108 is turned in the opposite direction.

Cable 38, in extending rearwardly from its first end 39, advances to the upper side of one of the pulley wheels 108, and then extends about the pulley wheel through several turns, to ultimately advance forwardly at 114 (FIG. 1) to the location of an idler pulley wheel 115 which is mounted by a shaft 116 projecting downwardly from frame element 28. This pulley 115 turns about an essentially vertical axis 117. After passing about idler 115, the cable 38 reverses its direction and extends rearwardly again at 117', at the right side of rear wheel 15, to then extend along the underside of the second of the pulley wheels 108. After extending about that second wheel 108 several times, the cable advances forwardly again at 118 for connection at the location 40 to the vertically adjustable block structure 70 of the right hand pedal crank. The cable thus interconnects the two pedal cranks in a manner causing upward retracting movement of one pedal in response to downward depression of the other pedal.

In order to assure a positive driving connection between the cable and the clutch wheels 108, the cable is preferably secured against slipping movement relative to each of the wheels 108. For this purpose, each wheel 108 may carry one or more locking screws 119, and the cable may have an intermediate portion or portions extending inwardly through an opening 120 in each wheel 108, to then extend about the shank of a screw 119, and then radially outwardly through another opening to the periphery of the wheel. When the screw 119 is tightened, it then clamps the engaged portion of the cable against the radial web of the wheel 108, to positively retain that portion of the cable against movement relative to the wheel. The outer surface of the wheel 108 may be shaped to define two grooves 121 and 122, with the cable being wound through several turns in each groove, and being advanced into retained engagement with screw 119 at the location at which the cable advances from one of the grooves to the other. When the left pedal is pushed downwardly through its range of travel, the cable unwinds from the left groove of each wheel 108, and winds into the right groove of each wheel, with the reverse action occurring when the right pedal is pressed downwardly and left pedal returns upwardly. On each motion, one of the two one-way clutches drives the rear wheel in an advancing direction, while the wheel 108 of the other clutch turns in the oposite direction without driving the rear wheel of the bicycle.

The forward mechanism 44, as illustrated best in FIGS. 10 and 11, includes another flexible essentially nonstretchable cable 123 which is connected at its opposite ends 124 and 125 (FIG. 1) to the front sides of the two crank arms 29 respectively. From the location 124, cable 123 advances first forwardly at 126 (FIG. 11), then about the forward side of an idler pulley 128 turning about a vertical axis 134, and then rearwardly at 129 to the point of connection 125 to the second of the arms 29. Pulley 128 is mounted rotatably by a vertical screw 130 and a bearing 131 thereabout whose inner race is located between two nuts 132 on the screw. A yielding forward force is exerted against screw 130 and the idler 128 by a coil spring 135 acting against a transverse forward wall 136 fo a tubular part 137 to which the upper end of screw 130 is welded or otherwise secured. Part 137 is slidably movable along an axis 138 within an outer tube 139 having an axial slot 140 at its underside through which screw 130 extends. The rear end of spring 135 bears against a part 141, which is threadedly carried by an adjusting screw or shaft 142, rotatable manually by a knob 143 bearing rearwardly against a cap 144 on tube 139. A ring 145 may be retained within the forward end of tube 139 as by set screws 146, to reinforce the tube at that location. Part 141 is retained against rotation by reception of a lug 147 on part 141 within an axial slot 147' in the upper portion of part 137. Thus, rotation of screw 142 acts to adjust part 141 axially and thereby adjust the force exerted forwardly by spring 135 on pulley 128.

To now describe the operation of the drive system of FIGS. 1 to 13, assume that the mechanism is in the condition illustrated in FIG. 1, and that a user then sits on the seat 17 and commences to press the two pedals 12 and 13 alternately downwardly with his feet while steering the front wheel with handlebars 18. When the two pedals are in the extreme positions of FIG. 1, the rider presses downwardly on the right hand pedal 13, while allowing the left pedal 12 to move upwardly. If toe clips 12' and 13' are utilized on the pedals, then the left pedal 12 may actually be pulled upwardly by the left foot, to supplement the downward action against right pedal 13. As the right pedal moves downwardly, it exerts a forward force against the end 40 of cable run 118, to unwind the cable from the right groove 122 of the right hand clutch wheel 108. This turns that wheel in a direction to drive the rear wheel 15 of the bicycle in an advancing direction. This same rotation of the right wheel 108 causes the portion 117' of the cable (FIG. 2) to move rearwardly and wind into the second groove 121 of the right hand wheel 108, with corresponding forward movement of the cable portion 114 of FIG. 2, and rearward movement of the cable portion 118'. The left hand clutch wheel thus turns in a clockwise or nondriving direction as viewed in FIG. 1. When pedal 13 has advanced downwardly through its entire range of movement to the position of the pedal 12 in FIG. 1, the two pedals reverse their direction of movement, and the rider presses downwardly on pedal 12 and pulls upwardly on pedal 13 to reverse the direction of movement of cable 28, and cause the left hand clutch wheel 108 to drive while the right hand clutch wheel moves in a nondriving or free wheeling direction. Cable 123 moves about its idler in correspondence with the movement of the pedals and pedal arms 29, and at all times exerts a forward force against both of these pedal arms to maintain the rear cable 38 taut. The overall result is an extremely effective pedal actuated propelling effect which is much more efficient in operation than the conventional rotary chain and sprocket arrangement.

When the operator wishes to alter the effective transmission ratio of the drive system of FIG. 1, he merely actuates handles 85 to turn the connected pulley wheels 81 about axis 87, thus advancing both of the cables 41 in unison to move upwardly or downwardly the points 39 and 40 at which the ends of cable 38 are connected to arms 29. As these points of connection move upwardly, they shorten the effective lever arm of crank elements 29 with respect to axis 31, and thus have the effect of shifting to a lower gear condition. An infinite number of different transmission ratios are thus attainable, within the limits of adjustment allowed by slots 74 of the crank arms (FIG. 9). At each setting, the effective length of the left arm is the same as the effective length of the right arm, and both may be set in any desired position by tightening of the lock screw 95 of FIG. 3 to frictionally retain handles 85 against rotation.

Figure 14:
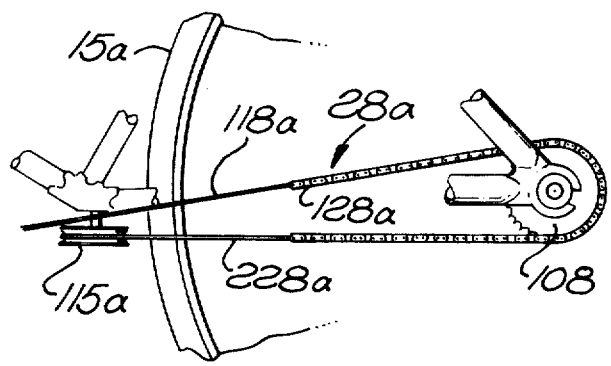
FIG. 14 is a fragmentary side view of a variational form of the invention.

FIG. 14 represents fragmentarily a variational form of the invention which may be identical with that of FIGS. 1 to 13 except that in lieu of the single continuous cable 38 of FIG. 1 there is provided an elongated flexible member 28a which is formed of a series of sections connected in end to end relation, with two of the sections being flexible drive chains 128a engaging a pair of sprocket wheels 108a at opposite sides of the rear wheel 15a of the bicycle. These sprocket wheels 108a serve the purpose of the pulley wheels 108 of FIG. 12, and are the driving elements of the one-way clutches, and are engaged by chains 128a in positive driving relation without requiring several turns about the sprocket wheel as in the case of the pulley wheels 108. A length of cable 228a between the two chains 128a extends about a frame mounted idler 115a corresponding to idler 115 of FIG. 1, and the two cable portions 118a connected to the other ends of the chains extend forwardly for connection to the two pedal crank arms at locations corresponding to those represented at 39 and 40 in FIG. 1. The operation of the arrangement of FIG. 14 is the same as in FIGS. 1 to 13, except for the chain type drive of the one-way clutches.

FIGS. 15 to 20 show another variational drive system embodying the invention, which form is especially adapted for use in a small pedal driven car of a type having two rear wheels 148 in lieu of the single rear wheel 15 of FIG. 1. The vehicle of FIG. 15 may if desired be a tricycle, having a single steerable front wheel 149 as shown, or may alternatively be a four-wheel car having two steerable front wheels.

Figure 15:
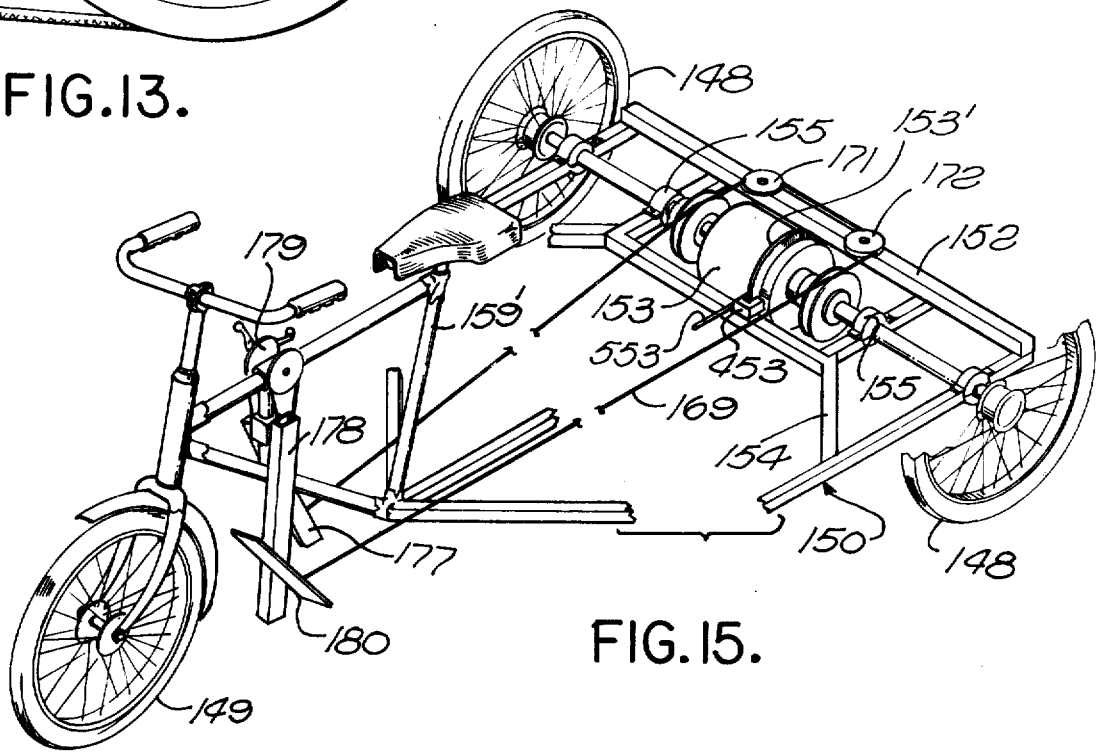
FIG. 15 is a fragmentary perspective view of another form of drive mechanism embodying the invention and which may be applied to a three or four wheel pedal driven car or other vehicle.
Figure 16:
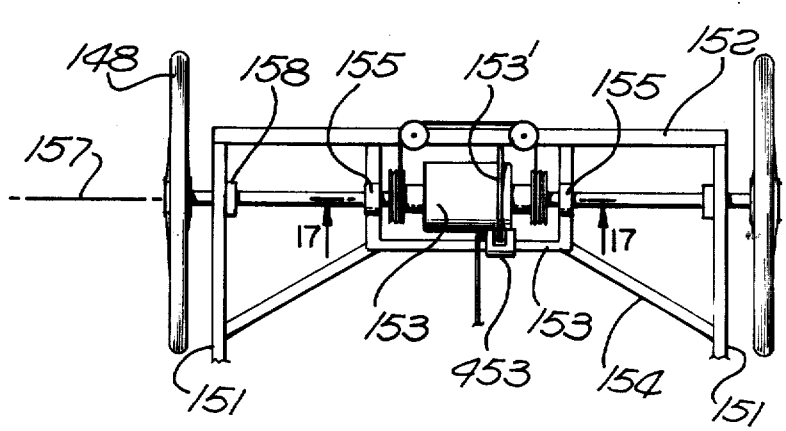
FIG. 16 is a fragmentary plan view of the FIG. 15 system.

The rear portion of the FIG. 15 vehicle includes a rigid frame 150, which may be formed of two parallel opposite side members 151 interconnected by one or more rigid cross members 152 and other elements forming a cage within which a differential structure 153 is rotatably mounted. A member 153' may extend across the front of the cage, and be held in place by angular brace members 154 of the frame, with two bearings 155 being supported between elements 152 and 153' as shown to journal two drive shafts 156 for rotation about a horizontal axis 157 with the two carried wheels 148. Additional bearings 158 may be mounted to the frame adjacent side members 151, to further journal the shafts for rotation. A body or seat structure 159 on which the driver sits may be carried by a forward frame 159' to which front wheel 149 is connected, with the rear portion of frame 159' desirably being supported from rear frame 150 by appropriate resilient suspension elements (not shown).

FIG. 17 shows the interior of the differential unit 153, which may include two bevel gears 159 conected to shafts 156 and meshing with two additional revolving bevel gears 160 mounted to turn about an axle 161 carried by and extending diametrically across the interior of an outer cylindrical drum 162 forming a housing of the differential. The opposite ends of drum 162 are closed by a first transverse end wall 163 which is appropriately rigidly secured to a first inner clutch element 164, as by welding at 165, to be driven rotatably by element 164, and a second end wall 166 secured removably to drum 162 by screws 167 and similarly screwed or otherwise rigidly secured to a second inner clutch element 168. A brake disc 153' may be rigidly secured to drum 153 as by lugs 253 projecting through apertures in the drum and retained by screws 167, with a pair of brake pads 353 carried by a housing 453 being actuable against disc 153' by a manually actuated cable 553 to lock drum 153 against rotation when desired.

The drive cable 169, corresponding to cable 38 of FIG. 1, extends about two pulley wheels 170, corresponding to wheels 108 of the first form of the invention, and between these two wheels extends about a pair of idlers 171 and 172 turning about vertical axes and serving the function of the idler 115 of FIG. 1. Two series of one-way clutch rollers 173, serving the function of rollers 110 of FIG. 12, are interposed radially between one of the elements 170 and element 164, and between the other element 170 and element 168, to form two one-way clutches which can turn drum 162 in a vehicle advancing direction, but not the reverse direction, as described previously. Elements 170 are mounted for rotation about shafts 156 by ball bearings 174, while the inner clutch elements 164 and 168 are similarly mounted rotatably about the shafts by bushings 175. The gears 159 are of course keyed to the shafts for rotation therewith. Thus, when the cable 169 is advanced longitudinally in one direction, by actuation of a first of the pedals 176, drum 162 is driven in an advancing direction by a first of the one-way clutches, whereas when the cable moves in the opposite longitudinal direction by reverse movement of the pedals the drum is still turned in that same direction but by the other one-way clutch. The rotation of the differential drum 162 acts through gears 160 and 159 to correspondingly drive shafts 156 and wheels 148, with the bevel gears permitting differential movement of the wheels on cornering.

In the vehicle of FIG. 15, I have illustrated a somewhat different type of pedal structure which is designed for situations in which the operator's feet can press more directly forwardly, rather than primarily downwardly as in FIG. 1. More particularly, in the FIG. 15 arrangement, the pedals are pivoted to swing about a pair of axes 177 which are closely proximate to swinging pedal arms 178 (corresponding to arms 29 of FIG. 1). Also, pedals 176 are actuable upwardly and downwardly by the control mechanism 179, with each pedal moving upwardly as the corresponding point of connection 180 to the cable 169 shifts downwardly, and vice versa. Alternatively, it is contemplated that in lieu of the control system of FIG. 15 which is about to be described, separate controls for the pedals and points of connection 180 may be provided so that the pedals may be adjusted independently of the points of connection 180 and the latter may similarly be adjusted independently of the pedals.

FIG. 19 is a view similar to FIG. 8, but showing the changed cross-section of each of the crank arms 178 for permitting upward and downward movement of the pedals as well as the points of connection between these crank arms and the main cable. As seen in FIG. 19, the cross-section of arm 178 is essentially rectangular, defining two essentially rectangular front and rear vertical passages 181 and 182, separated by a divider 183. A block 184 is mounted for upward and downward sliding movement within passageway 182, and is connected to one end of the main cable at 180. This block 184 carries one or more set screws 187 tightenable against adjusting cable 188, while a second cable 189 extends through a passage in the block and is movable therein. A similar vertically slidable block 190 is provided at the front of arm 178 within passage 181 and carries one or more set screws 191 which attach block 190 to cable 198 rigidly, while allowing relative vertical movement of the second cable 188. Block 190 may project forwardly through a vertically elongated slot 192 in part 178, and rigidly carries a horizontal shaft 193 to which the corresponding pedal 176 is mounted for pivotal adjusting movement about a horizontal axis.

As seen in FIG. 20, the cable 188 associated with each pedal structure extends at its upper end about an enlarged diameter portion 194 of a corresponding pulley wheel 195, while the second control cable 189 at its upper end extends about a reduced diameter portion 196 of the same pulley wheel. These cables are connected to the pulley wheel in the same manner as discussed in connection with cables 43 of the first form of the invention, and extend downwardly between two pairs of guide rollers 197 (FIGS. 18 and 20). At the lower end of each crank arm 178, the two associated cables 188 and 189 extend about a pair of adjacent idler rollers 198 (FIG. 18) to complete the essentially endless loops of the cables.

In operating the device of FIGS. 15 to 20, the driver alternately presses forward against the two pedals 176, to cause movement of cable 169 alternately in opposite longitudinal directions, and to drive the rear wheels through the two one-way clutches on each direction of movement of the cable. When he desires to alter the effective transmission ratio, pulley wheels 195 are rotated about their horizontal axes by handles 199, to move the cable ends 180 upwardly while pedals 178 move downwardly, or vice verse, to attain an infinite and continuous controlled adjustment of the speed ratio. As will be apparent, upward movement of the pedals alters the ratio in the same direction as does downward movement of the points of cable connection 180. Because of the smaller diameter of the portions 196 of pulleys 195 compared with their larger diameter portions 194, the pedels move more slowly than the points of connection 180 in the illustrated optimum arrangement. The pedals may pivot freely about their axles 193 as they are actuated, or may be locked in set positions relative to their arms 178 by screw and slot adjustments represented at 202 in FIG. 18.

The additional variational arrangement illustrated somewhat diagrammatically in FIGS. 21 and 22 is a drive mechanism for a boat 203 in which a propeller 204 is driven about a horixontal axis 205 by alternate forward and rearward movement of two pedals 206 and 207. These pedals are mounted to swing about a horizontal axis 208, and are connected to the opposite ends of a main cable 209 at 210 and 211. At these two locations, the cable ends are connected to blocks 212 corresponding to the structures 70 of FIGS. 1 to 13, which blocks are actuable upwardly and downwardly within the hollow pedal arms 206 and 207 by rotation of a control element 213 having handles 214 and acting to shift the block upwardly and downwardly by a pair of essentially endless cables 215 corresponding to cables 43 of FIG. 1.

The main cable 209 extends rearwardly from the two points of connection 210 and 211 to the location of a pair of idler pulleys 216 turning about a horizontal axis, with the cable runs then extending upwardly at 217 and 218 to pass about two idler pulleys 219 and 220 turning about horizontal axes. From pulley wheel 219, the cable extends several times about a first outer clutch pulley 221, while in extending rearwardly from the other idler 220 the cable extends about a second outer clutch drive pulley 222. After being would about the two wheels 221 and 222, the cable extends between these two wheels and about an idler 223 which is appropriately mounted to turn about a fixed horizontal axis 224, and which serves the function of idler 115 of FIG. 1. One-way clutches 225 within the two pulley wheels 221 and 222 act to drive vertical shaft 226 in only a predetermined direction causing boat advancing rotation of screw 205, but not in the opposite direction. This rotation of vertical shaft 226 is transmitted to the horizontal shaft 227 which drives screw 204 through a pair of bevel gears 228 allowing for turning movement of screw 204 about the vertical axis 229 to steer the vehicle. A housing 230 disposed about and carrying the screw and gears 228 has a tubular portion 231 extending upwardly about the shaft and journaled by a bearing 232 for steering rotation through 360° about axis 229. A steering cable 233 operated by steering wheel 234 and wound about pulley wheels 235 on the shaft of that steering wheel is guided rearwardly by idlers 346 to a location of extension about a pulley wheel 237 secured to the upper end of tube 31, to turn that tube and the screw in correspondence with rotation of the steering wheel.

When the boat of FIGS. 21 and 22 is in use, the operator presses the two pedals in a forward direction alternatively, to move cable 209 first in one longitudinal direction and then in the opposite longitudinal direction, with movement in the first direction acting through wheel 221 and its one-way clutch elements to drive screw 204 in a boat advancing direction, and with movement of the cable in the opposite direction acting through the second one-way clutch within wheel 22 to drive the shaft 226 and screw in the same rotary direction, while the first wheel 221 turns without any driving action against the screw. As in the other forms of the invention, very high efficiency is attained with little mechanism and with apparatus of very rugged and reliable construction. Adjustment of the effective drive ratio infinitely within a wide range can be attained, as in the other forms of the invention, by rotation of the control element 213 to move the points of connection 210 and 211 of the cable upwardly and downwardly along the pedal structures. The boat can be steered during operation of the pedals by turning propeller 204 to face in any desired direction, through 180° in either circular direction from the position illustrated in FIG. 21. When the propeller is swung through 180° to face forwardly, it can provide a very effective braking action for the boat.

Figure 23:
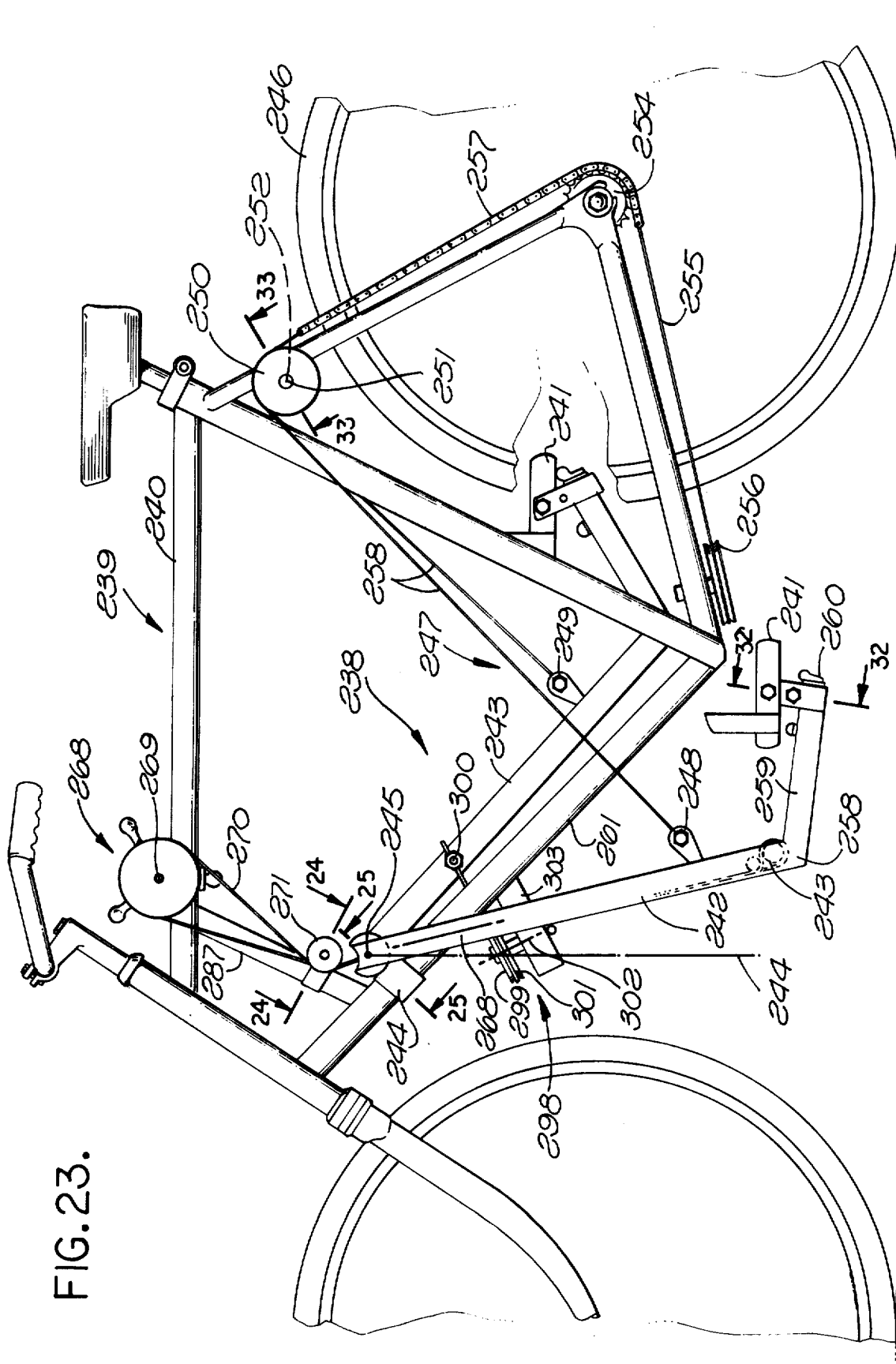
FIG. 23 shows another variational bicycle drive embodying the invention.

FIGS. 23 to 33 show another variational drive assembly 238 enbodying the invention, as applied to a bicycle 239 having a frame 240 similar in most respects to the frame of FIG. 1. The pedals 241 in FIG. 23 are carried by two left and right crank arms 242 and 243 which are mounted by a bracket 244 to swing about a horizontal axis 245 between a forwardmost position represented by the left pedal of FIG. 23 and a rearmost position represented by the right pedal in that figure. These crank arms are in all positions preferably located to the rear of a vertical plane 244 extending through the pivotal axis 245 of the crank arms, so that the crank arms swing rearwardly and upwardly to facilitate actuation of these arms by primarily downward force exerted against the pedals by a rider. In order to effectively drive the rear wheel 246 in response to such rear and upward swinging movement of the pedals and crank arms, the elongated flexible drive unit 247 (corresponding to cable 38 of FIG. 1) extends upwardly as it advances rearwardly from its points of connection 248 and 249 to the crank arms, to pass about a pair of idler pulley wheels 250 mounted by a shaft 251 to turn about a horizontal axis 252. From the locations of these idlers 250, the two opposite side portions of elongated unit 247 extend downwardly and rearwardly for engagement with a pair of sprocket wheels 254 at opposite sides of bicycle wheel 246, and then advance forwardly at 255 for extension about an idler 256 corresponding to and serving the function of the idler 115 of FIG. 1. The sprocket wheels 254 drive wheel 246 through a pair of oneway clutches corresponding to clutches 41 of the first form of the invention. Also, the FIG. 23 arrangement is illustrated as having the elongated flexible unit 247 formed sectionally, to include a pair of flexible drive chains 257 at the locations of the sprocket wheels 254, for driving those sprocket wheels very positively in accordance with longitudinal movement of unit 247, in accordance with the teachings of FIG. 14 which shows corresponding chains at 128a. First ends of these chains are connected by flexible cable lengths 258 to the pedal carrying arms 242 and 243, while second ends of the chains are connected to one another through a length of cable at the location 255.

The crank arms 242 and 243 may be of the square cross-section illustrated in FIGS. 29 t0 31, and may have first straight portions extending from the upper ends of arms 242 and 243 to lower locations 258, at which the square section arms may extend rearwardly at 259 to extremities 260 near which pedals 241 are carried. The bracket 244 which pivotally mounts the upper ends of arms 242 to the frame of the bicycle may be a clamp similar to that shown at 30 in FIG. 4 and rigidly carried by an upwardly and forwardly inclined tubular portion 261 of the bicycle frame. As seen in FIG. 25, clamp 244 may carry a transverse shaft 262, to the opposite ends of which a pair of screws 263 secure the inner races 264 of a pair of ball bearings 265, whose outer races are rigidly secured to a cylindrical outer tube 266, as by providing a clamping screw 366 (FIG. 26) for tightly clamping a split portion of that part 266 inwardly against the bearing. The longitudinal axes 268 of arms 242 and 243 intersect and are perpendicular to the pivotal axis 245 of bearings 265.

A manually actuated control unit 268 (FIG. 23) corresponding to unit 42 of FIG. 1 is rotatable manually about an axis 269 to cause longitudinal advancement in opposite directions of a pair of adjusting cables 270 corresponding to cables 43 of FIG. 1. Each of these cables has two runs which extend downwardly about a pair of pulley wheels 271 (FIG. 24) and then enter and extend downwardly within a corresponding one of the crank arms 242 or 243, to ultimately extend about a lower roller 244 carried within that arm to that downward movement of one of the cable runs causes upward movement of the other cable run, and vice versa. More particularly, as seen in FIGS. 28 to 30, a first of the runs 272 of the cable extends downwardly at the forward side 273 of pulley wheel 244, and then extends rearwardly at the underside of that pulley wheel and upwardly at its rear side. After extension about pulley wheel 244, the cable extends inwardly or forwardly at 274 so that the second run 275 of the cable passes about the forward side of a second pulley wheel 276 at 277. Thus, both of the runs 272 and 275 are received near a front wall 278 of the arm 242 or 243. In order to locate these two runs 272 and 275 in laterally offset relation with respect to one another, the idler wheels 244 and 276 turn about differently disposed axes 279 and 280, as best seen in FIGS. 29 and 30, with the shafts of these idlers being connected into the opposite side walls 281 of the crank arm as shown. Preferably axis 280 of the wheel 276 is disposed directly transversely of the arm, while the axis 279 of wheel 244 is cocked slightly, so that the rear portion 282 of wheel 244 lies in the same vertical plane 283 as does the forward portion 284 of wheel 276, while the forward portion 285 of wheel 244 is offset laterally (see FIG. 29).

The two sets of pulley wheels 271 at the opposite sides of the bicycle may be carried by a clamp 286 (FIG. 24), which is clamped onto a tubular frame member 287, and carries aligned screws 288 projecting in opposite directions from the clamp to mount the idler pulleys 271 for rotation about a common horizontal axis 289 parallel to axes 245 and 269.

The forward ends of cable lengths 258 are connected to a pair of blocks 290 (FIG. 28), which are slidably mounted within the two arms 242 and 243 resectively, and are secured to cables 258 by pivot pins 291. Screws 292 within these blocks lock one of the runs of the cable (typically run 272) in fixed position relative to the block, to require upward and downward sliding movement of the block in correspondence with longitudinal movement of the cable, while the other run of the cable (272 in FIG. 31) is free for longitudinal movement within a passage 293 in block 290. The part 294 which is pivotally connected by pin 291 to block 290 extends rearwardly through a vertically elongated slot 295 in the rear wall of arm 242 or 243, to allow upward and downward shifting movement of the point of connection of the cable to the arm. As seen in FIG. 31, each of the parts 294 may be connected to the associate cable by a screw 296 and nut 297 connected to the part 294.

The arms 242 and 243 are yieldingly urged forwardly by a take-up mechanism 298 serving the function of mechanism 44 of FIG. 1, and including a cable 299 whose opposite ends are connected to arms 242 and 243 as illustrated at 300, and which extends forwardly about an idler pulley 301 turning about an axis 302. The shaft of this idler pulley may be yieldingly urged forward by a coil spring such as that shown at 135 in FIG. 10, and contained within a case 303. Thus, the mechanism 298 of FIG. 23 may be essentially the same as the mechanism 44 of FIG. 10, but inverted so that the pulley wheel 299 is at the upper side rather than the underside of the mounting structure.

FIG. 32 shows the manner in which the pedals 241 may be pivotally and adjustably mounted to the rearwardly extending portions 259 of swinging arms 242 and 243. More particularly, as seen in FIG. 32, these rearwardly extending portions of the arms may be of essentially the same square cross-section as the more vertical main portions of the arms, with clamps 304 being received about arm positions 259 and including two clamp sections 305 and 306 tightenable by a screw 307 to tightly and rigidly retain the clamp in any of the different positions along the length of portion 259. Thus, a front to rear adjustment of the position of each of the pedals is provided. The upper portion of clamp section 305 carries a lateriaIly projecting shaft 308, secured to element 305 by a nut 309, and received within a passage 310 in the corresponding pedal 241, with a nut 311 being connected to the outer end of the shaft 308 to retain the pedal on the shaft while permitting pivotal movement of the pedal about the axis 312 of the shaft. Preferably, the shaft and passage 310 are tapered conically as shown so that tightening of the nut 311 will effectively retain the pedal on the shaft in an accurately centered relation.

In riding the bicycle of FIGS. 23 to 33, the rider alternately pressed downwardly on the two pedals 241, to oscillate the arms 242 and 243 forwardly and backwardly about their pivotal axis 245, and reversely with respect to one another, so that the elongated flexible unit 247 will act to drive rear wheel 246 of the bicycle through the two sprocket wheels 254 and their associated one-way clutches alternately, as discussed in connection with the other forms of the invention. The effective transmission ratio of the drive system can be altered by manual rotation of the control structure 268, to move blocks 290 and the connected forward ends 248 and 249 of the flexible drive element 247 upwardly and downwardly along arms 242 and 243, to thereby vary the effective lengths of these arms with respect to the drive cable.

FIGS. 34 through 37 illustrate a sewing machine 313 having a pedal actuated drive mechanism 314 constructed in accordance with the invention. In this arrangement, the sewing machine 313 may be of any conventional construction, having a hollow body 315 with a lower portion 316 presenting an upper horizontal surface 317 on which the fabric or other material to be stiched is received, and having an upper portion 318 spaced above surface 317 and carrying a downwardly projecting needle 319 in a needle holder 320 which is reciprocated vertically to effect a stitching action by mechanism contained within body 315 and driven by rotation of a pulley wheel 321 driving a horizontal shaft 322. The thread is drawn by the needle from a spool 323 mounted at the top of the sewing machine, and from the usual bobbin located within the lower portion 316 of the body.

The sewing machine proper 313 may be supported within an essentially rectangular opening 324 in a horizontal table top 325 supported by a number of vertical legs 326 and 326a. The leg 326a is connected at its lower end to, and supported by, a horizontal base plate 327 which engages a floor surface 328 and movably mounts two pedals 329 and 330 which are reciprocated reversely by the two feet of a user. To allow such movement, each of the pedals is connected by a hinge 331 at its forward end to swing upwardly and downwardly about a horizontal axis 332 between a lower position corresponding to that of pedal 330 in FIGS. 34 and 35 and upper position corresponding to that of pedal 329. Each of the pedals may be formed merely of an elongated rigid member 333 of wood or the like having an upper planar surface 334 on which a layer 335 of rubber or other material may be carried. Adjustably shiftable heel stoppers 336 may be attached to the forward ends of the pedals near their pivotal axes.

The pedals serve together to rotate a horizontal shaft 337 which is mounted by bearings 338 to turn about a horizontal axis 339 spaced beneath the sewing machine proper 313. As seen best in FIG. 37, this shaft carries a sleeve 338' fixed to the shaft by a set screw 339a and adapted to be driven rotatably by two one-way clutches 340 and 341 actuated by a longitudinally movable elongated flexible unit 342 connected to the pedals. As will be understood best from FIG. 34, this elongated flexible unit 342 may include a first cable portion 343 connected at one end to the left hand pedal 330, and connected at its opposite end 344 to a flexible drive chain 345 which engages and drives a sprocket wheel 346 for driving one-way clutch 341. The second end of chain 345 may be connected at 347 to a cable 348, which extends downwardly and rearwardly to the location of an idler pulley 349 mounted rotatably by a bracket 350 secured to leg 326a. After passing about idler 349, the cable 348 extends upwardly and forwardly to connect to a second flexible chain 351 extending about and driving a second sprocket wheel 352 which turns the second one-way clutch 340. Chain 351 then connects to a final cable portion 353 which is attached to the right hand pedal 329. Thus, in correspondence with the previously discussed forms of the invention, recriprocation of the pedals upwardly and downwardly, and reversely with respect to one another, acts to move the elongated flexible unit 342 alternately in opposite longitudinal directions, and to thereby drive the two sprocket wheels 346 and 352 alternately in opposite directions and reversely with respect to one another. The oneway clutches 340 and 341 drive in a common direction, so that when one pedal is pressed downwardly clutch 340 drives shaft 337 in a predetermined rotary direction while clutch 341 is inactive, and then when the other pedal moves downwardly clutch 341 drives shaft 337, still in the same direction, but with clutch 340 being inactive.

The two clutches 340 and 341 may be essentially identical, and very similar to the one-way clutches desicribed in the earlier portions of the application, with each clutch including an outer sleeve 354 to which the associated sprocket wheel 346 or 352 is rigidly connected. A liner 355 may be contained within each of the sleeves 354 in fixed position relative thereto, with two series of roller bearings 357 mounting the liner 355 and sleeve 354 for rotation about sleeve 338. Axially between the two series of roller bearings 357, a circular series of roller type clutch elements 356 may be carried for engagement with camming surfaces in the liner similar to those shown at 113 in FIG. 13 to attain the desired one-way driving action. Annular locating elements and grease retainers 358 and 359 may be provided at opposite ends of the two clutch assemblies, with a spacer sleeve 360 between the clutches, and with all of the parts being held in place axially by rings 361 and 362 secured to shaft 337 by set screws 363.

The two cables 343 and 353 are connected to pedals 330 and 329 adjustably by means of two shiftable blocks 364 and 365 which are movable slidably along the depending flanges 366 of two angle irons 367 secured to the inner edge portions of the undersides of the two pedals. These angle irons may be attached by screws as represented at 368. As will be apparent, the flanges 366 lie in vertical planes which are perpendicular to the pivotal axis 332 of the two pedals.

Figure 36:
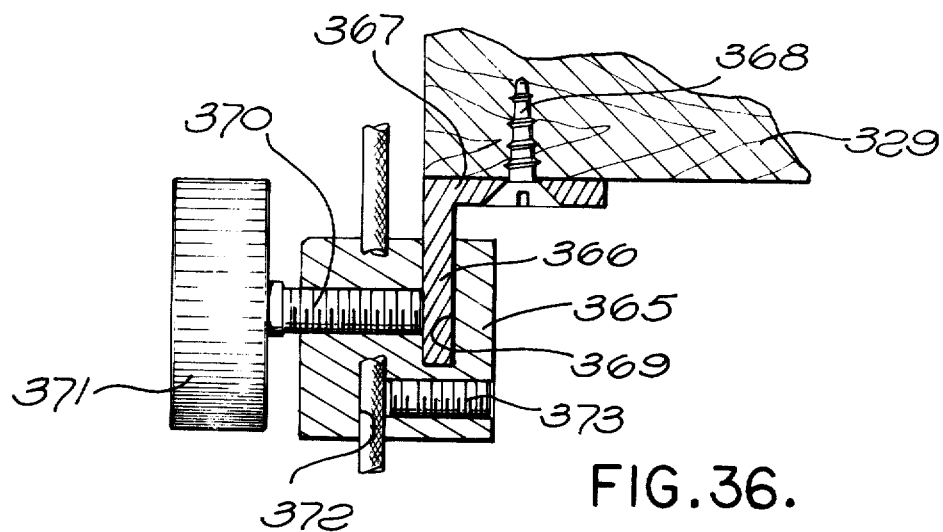
FIG. 36 is an enlarged fragmentary section taken on line 36—36 of FIG. 34.
Figure 37:
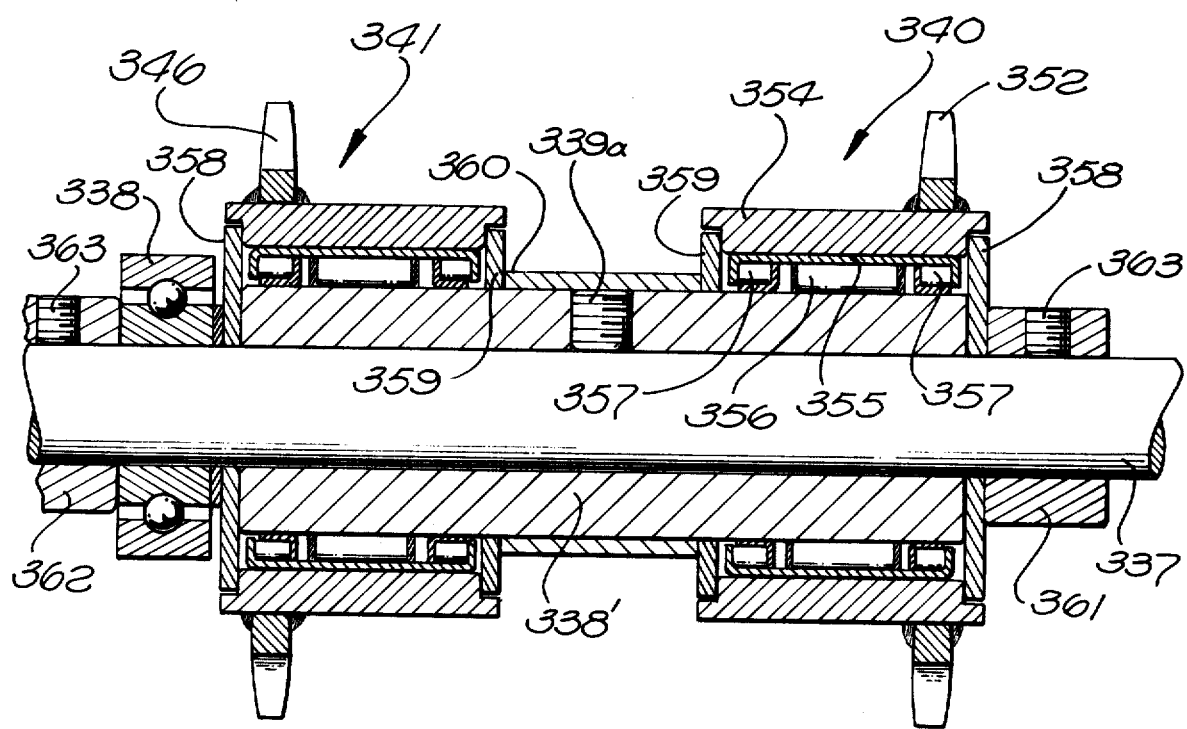
FIG. 37 is an enlarged fragmentary section through the two one-way clutches and associated parts of the FIG. 34 drive mechanism.

As seen best in FIG. 36, each of the blocks 365 has a vertical recess or guideway 369 within which the coacting flange 366 of the associated angle iron is slidably received, in a relation allowing the block to be slid along the angle iron and longitudinally of the pedal, to vary the radial distance from axis 332 to the blocks 364 and 365. Each of the blocks is adapted to be locked in any desired set position along the angle iron, as by a lock screw 370 (FIG. 36), connected threadedly into the block 365 and tightenable against flange 366 by manual rotation of a knob 371 secured rigidly to the outer end of the screw. Cables 343 and 353 may be attached to blocks 364 and 365 by passing the cables partially about the blocks and then inserting the cable ends into recesses 372 in the blocks to be locked in fixed position therein by set screws 373.

Figure 34:
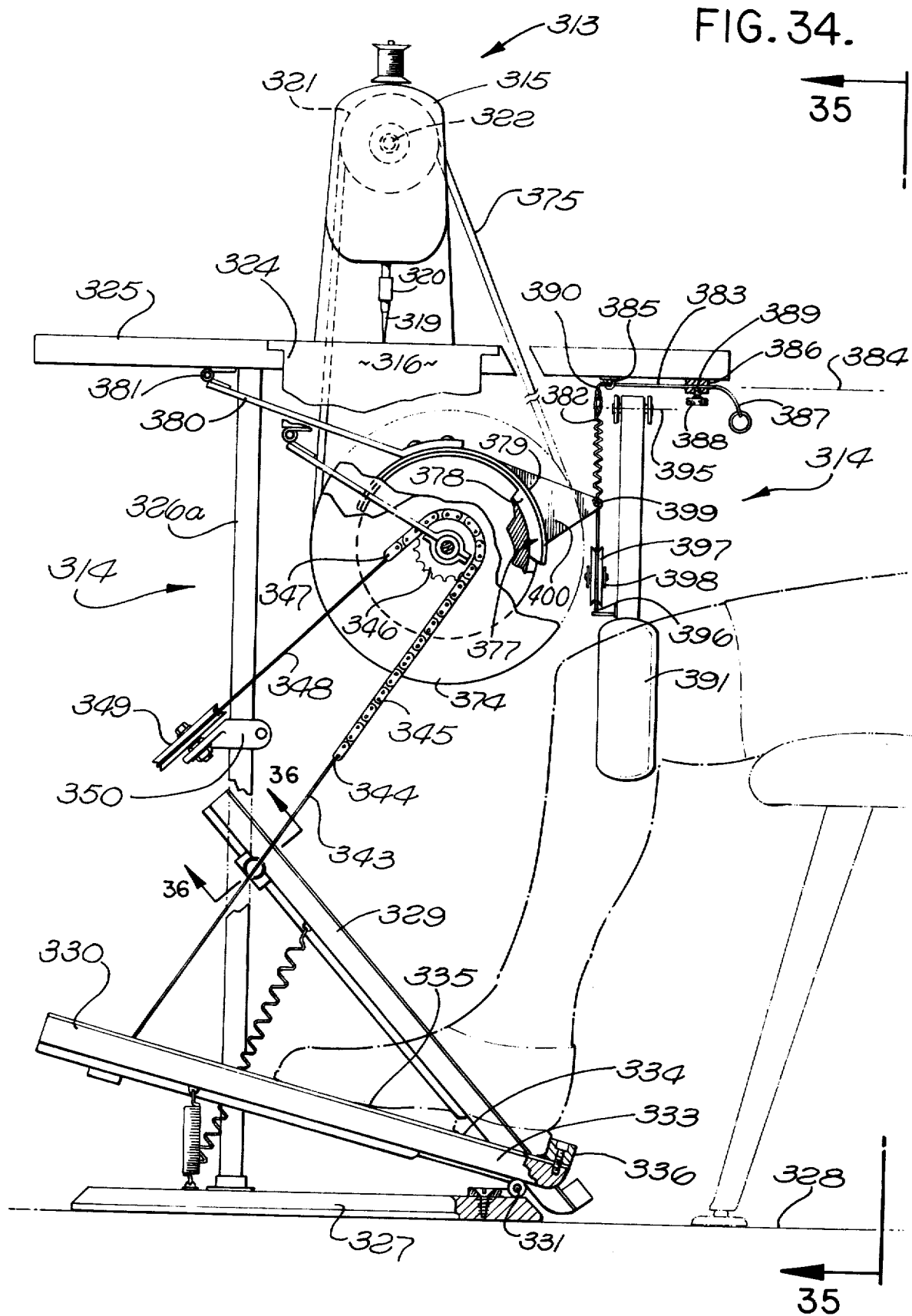
FIG. 34 is a side view of a sewing machine drive mechanism embodying the invention.
Figure 35:
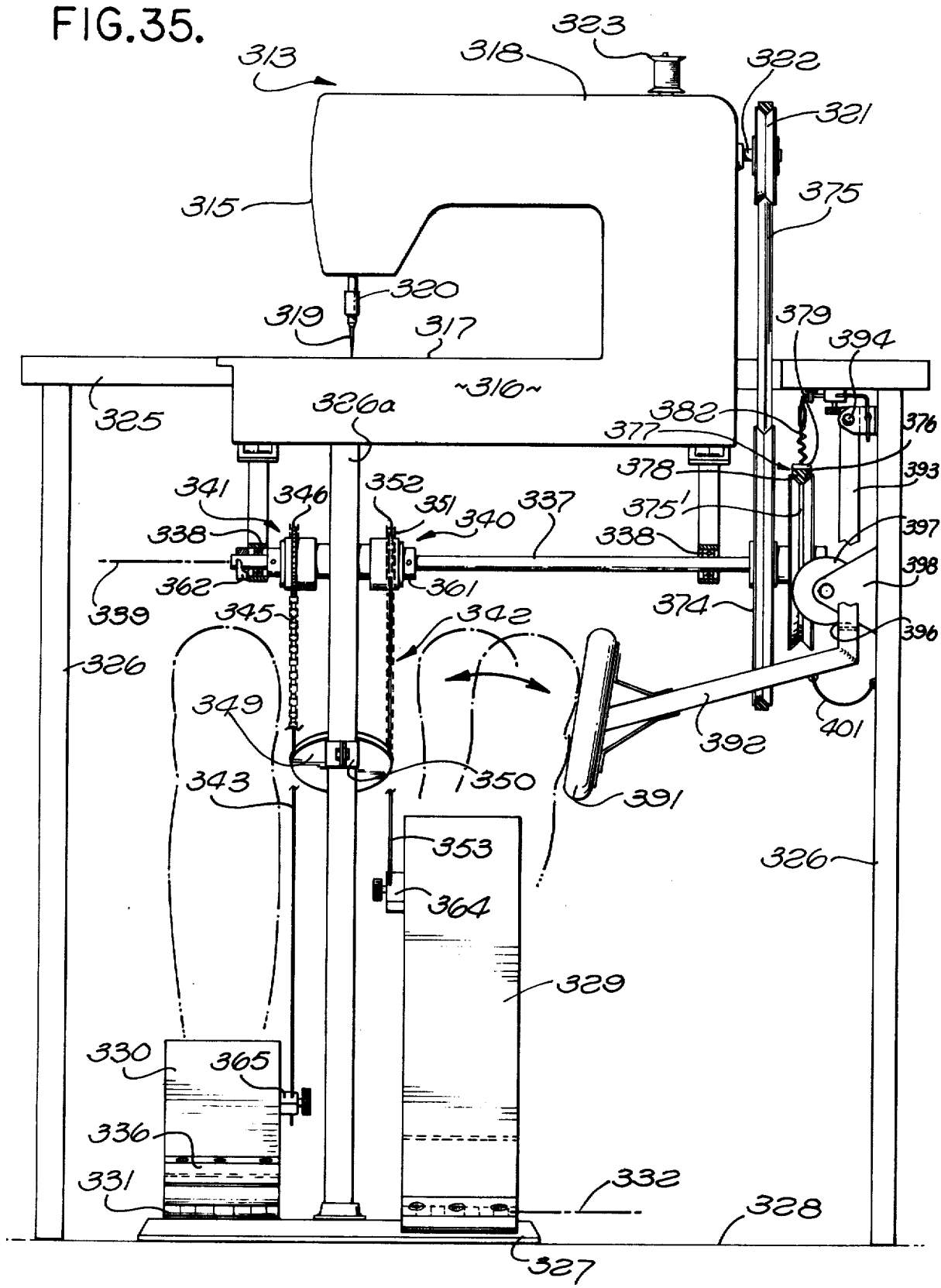
FIG. 35 is a front view of the sewing mechanism taken on line 35—35 of FIG. 34.

Near its right end as viewed in FIG. 35, the main drive shaft 337 of the mechanism rigidly carries a pulley wheel 374, which engages a belt 375 which drives the previously discussed pulley wheel 321 of the sewing machine proper. Beyond wheel 374, shaft 337 carries another pulley wheel 375', which may have a V-shaped groove 376 engageable with an arcuately curved brake shoe 377 to halt the rotation of wheel 375' and shaft 337 when desired. As seen in FIG. 34, the brake shoe 377 has a high friction portion 378 engageable with wheel 375' and preferably backed by a rigid metal arcuate member 379. This entire brake shoe structure may be mounted by an arm 380, which is pivoted by a hinge 381 to swing upwardly and downwardly between released and active braking positions. A coil spring 382 may yieldingly urge the brake shoe upwardly to released condition, with a force which can be adjusted by turning an adjusting element 383 manually about a horizontal axis 384. This element 383 is journaled for such rotary movement by bearings represented at 385 and 386, and is turned by a handle 387, and locked in any set position by rotation of a knob 388 connected to a lock screw 389 at its inner end. Member 383 may have a portion 390 which is turned to be perpendicular to axis 384, and which is connected to the upper end of spring 382 at a location offset axis 384, to attain the desired tension adjustment by rotary movement of member 383.

The brake shoe 377 is actuable downwardly to its braking position by lateral deflection of a padded member 391 (FIG. 35) which is positioned to be deflected by rightward movement of the right knee of a user. This member 391 is carried by an arm 392 which extends upwardly at 393 for connection by a hinge 394 for pivotal movement about a horizontal axis 395 (FIG. 34). This pivotal movement is in a leftward and rightward direction as viewed in FIG. 35. A cable 396 connected at one end to the upwardly extending portion 393 of arm 392 extends leftwardly in FIG. 35 and then about an idler pully 397 which is mounted pivotally by brackets 398 to one of the legs of the cable structure. From the pulley wheel 397, cable 396 extends upwardly to connect at 399 (FIG. 34) to an arm 400 which is attached to and projects forwardly from brake shoe 377. Thus, rightward movement of the knee actuated element 391 acts through cable 396 to pull the brake shoe downwardly to its braking condition. Returning movement of the knee actuated element 391, under the influence of return spring 382, is limited by a flexible line 401 which is connected at one end to one of the legs of the table and at its other end to arm 392.

In using the sewing machine of FIGS. 34 to 37, a person alternately presses the two pedals 329 and 330 downwardly, with the interconnecting flexible structure 342 acting to retract one pedal upwardly in response to downward movement of the other. The two one-way clutches 340 and 341 respond to the longitudinal movements of structure 342 to drive shaft 337 continuously in a predetermined direction, and through belt 375 to drive the sewing machine proper 313 to perform a stitching operation. When it is desired to halt that operation at a particular point, the user stops the pedal movement and shifts his right knee in a rightward direction to move element 391 and set the brake in the manner previously discussed.

If it is desired to drive the machine at a relatively rapid rate, the two blocks 364 and 365 are shifted along the pedals to positions near the outer free ends of the pedals, and are locked in those settings to cause movement of the elongated flexible structure 342 through a relatively great distance on each movement of the pedals. Conversely, if slower speed operation of the sewing machine with higher torque is desired, the blocks 364 and 365 are shifted closer to pivotal axis 332 of the pedals, to reduce their effective radial distance from that axis. Thus, an infinite range of adjustment of speed and torque is attainable.

One important advantage of the discussed type of drive mechanism resides in the fact that the mechanism can always be started from any position by pedal movement alone, without requiring hand starting of pulley 321 as is necessary in most conventional pedal driven sewing machines. A similar facility of starting is attained also in the other forms of the invention.

While certain specific embodiments of the present invention have been disclosed as typical, the invention is of course not limited to these particular forms, but rather is applicable broadly to all such variations as fall within the scope of the appended claims.

I claim:
1. A drive assembly comprising:
  a foot actuated structure mounted to swing about an axis alternately in opposite directions, and including a pedal against which force is exerted by a user's foot to swing the structure about said axis;
  a movable member to be driven by said structure;
  mechanism for driving said member in response to oscillation of said foot actuated structure in said opposite directions about said axis;
  means connecting said mechanism operatively to said structure for actuation thereby at a location offset from said axis, and mounted for shifting movement in a relation moving the operative connection between said structure and said mechanism toward and away from said axis to thereby vary the effective length of lever arm of said structure and correspondingly alter the transmission ratio of said drive assembly;
  a second of said foot actuated structures swinging oppositely from said first structure;
  second connecting means connecting said mechanism to said second structure for actuation thereby and in a relation enabling shifting movement of the effective point of operative connection of said mechanism to said second structure toward and away from the axis about which said second structure swings; and
  control means actuable by an operator to simultaneously shift the point of connection of said mechanism to both of said structures toward or away from the axes of said structures.

2. A drive assembly comprising:
  a foot actuated structure mounted to swing about an axis alternatively in opposite directions, and including a pedal against which force is exerted by a user's foot to swing the structure about said axis;
  a movable member to be driven by said structure;
  mechanism for driving said member in response to oscillation of said foot actuated structure in said opposite directions about said axis;
  means connecting said mechanism operatively to said structure for actuation thereby at a location offset from said axis, and mounted for shifting movement in a relation moving the operative connection between said structure and said mechanism toward and away from said axis to thereby vary the effective length of lever arm of said structure and correspondingly alter the transmission ratio of said drive assembly;
  a second of said foot actuated structures swinging oppositely from said first structure;
  second connecting means connecting said mechanism to said second structure for actuation thereby and in a relation enabling shifting movement of the effective point of operative connection of said mechanism to said second structure toward and away from the axis about which said second structure swings; and control means actuable by an operator to simultaneously shift the point of connection of said mechanism to both of said structures toward or away from the axis of said structures;

said control means including a control part mounted to turn about an axis, and two elongated flexible elements longitudinally actuable simultaneously by said control part to shift said points of connection along said structures simultaneously.

3. A drive assembly comprising:

a foot actuated structure mounted to swing about an axis alternately in opposite directions; and a mechanism driven by swinging movement of said structure;

said swinging structure including a pedal against which force is exerted by a user's foot to swing the structure about said axis, and mounted for shifting movement toward and away from said axis to vary the effective lever arm of the pedal and thereby alter the transmission ratio of the drive assembly;

said foot actuated structure including an elongated arm to which said pedal is mounted slidably for movement longitudinally of the arm and toward and away from said axis, there being an elongated flexible element extending along said arm and operable by endless movement to shift said pedal longitudinally of the arm and toward and away from said axis, and a manually actuable control element mounted to turn about an axis and operable by such turning movement to move said flexible element longitudinally.

4. A drive assembly comprising:

a foot actuated structure mounted to swing about an axis alternately in opposite directions;

a mechanism driven by swinging movement of said structure;

said swinging structure including a pedal against which force is exerted by a user's foot to swing the structure about said axis, and mounted for shifting movement toward and away from said axis to vary the effective lever arm of the pedal and thereby alter the transmission ratio of the drive assembly;

a second foot actuated structure mounted to swing about an axis oppositely from said first structure and coacting with said first structure in driving said mechanism and having a second pedal movable toward and away from the axis about which said second structure swings;

two elongated flexible elements associated with said two swinging structures respectivly and operable to shift said two pedals respectively toward and away from their axes, and a common control unit actuable by an operator to simultaneously advance said flexible elements in unison and thereby actuate said pedals toward and away from their respective axes in correspondence with one another.

5. A drive assembly comprising:

two foot actuated structures each mounted to swing about an axis and alternately in opposite directions but swinging reversely with respect to one another, and including two pedals respectively to be actuated by the two feet of a user;

a rotary member to be driven by said structures;

elongated flexible means connected at opposite ends to said structures and acting to drive said rotary member rotatably in response to oscillatory swinging movement of said structures;

two connecting units attaching said opposite ends of said elongated flexible means to said structures respectively and mounted for shifting movement toward and away from the axis about which said structures swing;

a common control element for said two connecting units actuable by a user; and means for shifting said two connecting units and thereby said points of connection of said opposite ends of said elongated flexible means to said structures toward and away from the axes about which said structures swing in unison and in response to operation of said common control element.

6. A drive assembly as recited in claim 5, including means for shifting said pedals in unison toward and away from said axes of their respective foot actuated structures.

7. A drive assembly as recited in claim 5, in which said means for shifting and connecting units include two elongated flexible elements extending along said structures respectively and actuable in unison by said common control element, said pedals being shiftable toward and away from the axes of said swinging structures, and there being two additional elongated flexible elements actuable by said control element to move said pedals toward their swinging axes when said connecting units are moved away from the axes, and vice versa.

8. A drive assembly comprising:

two pedals mounted for actuation in a prdetermined first direction by the two feet respectively of a user, and returnable in an opposite second direction;

rotary means to be driven by said pedals;

two one-way clutches each having a rotary input element and each adapted to drive said rotary means from said input element in a predetermined driving direction but not in the opposite rotary direction;

a first length of flexible material actuable longitudinally by a first of said pedals to turn one of said clutch input elements in said predetermined driving direction in response to foot actated movement of said first pedal in said first direction;

a second length of flexible material actuable by the second pedal to turn the second of said clutch input elements in said predetermined driving direction in response to foot actuated movement of said second pedal in said first direction; and a connection for transmitting force between said two lengths of flexible material in a relation to retract each of said pedals in said second direction by force transmitted through said flexible material in response to foot actuated movement of the other pedal in said first direction.

9. A drive assembly as recited in claim 8, in which said connection is an additional length of flexible material extending between said two input elements of the clutches and interconnecting them for movement reversely with respect to one another.

10. A drive assembly as recited in claim 8, in which said rotary means include a differential having two power output shafts projecting in opposite directions and driven by said two clutches respectively, and two ground engaging vehicle propulsion wheels driven by said shafts respectively, said connection including an additional length of flexbible material extending from one of said clutch input elements to the other and interconnecting them for movement reversely with respect to one another.

11. A drive assembly comprising:
a foot actuated structure mounted to swing about an axis alternately in opposite directions, and including a pedal against which force is exerted by a user's foot to swing the structure about said axis;
a movable member to be driven by said structure;
mechanism for driving said member in response to oscillation of said foot actuated structure in said opposite directions about said axis;
means connecting said mechanism operatively to said structure for actuation thereby at a location offset from said axis, and mounted for shifting movement in a relation moving the operative connection between said structure and said mechanism toward and away from said axis to thereby vary the effective length of lever arm of said structure and correspondingly alter the transmission ratio of said drive assembly, and;
an elongated flexible element movable longitudinally and acting by such movement to shift said connecting means, and thereby said point of connection of said mechanism to said structure, toward or away from said axis;
said mechanism including a second elongated flexible element movable longitudinally by said oscillatory swinging movement of said structure and driving said member, and adjustably connected to said foot actuated structure by said connecting means.

12. A drive assembly as recited in claim 11, in which said foot actuated structure includes an arm mounted to swing about said axis, said connecting means including a unit to which said second flexible element is operatively connected, and means mounting said unit to said arm for adjusting movement relative thereto and toward and away from said axis by said first elongated flexible element.

13. A drive assembly as recited in claim 11, in which said structure includes an arm carrying said pedal and mounted to swing about said axis, said connecting means including a part to which said second elongated flexible element is connected and slidably mounted to said arm for movement therealong toward and away from said axis, said first mentioned elongated flexible element extending along said arm and being guided for longitudinal movement and connected to said part to actuate it slidably along the arm.

14. A drive assembly as recited in claim 13, including a control element mounted to swing about an axis and operable by such swinging movement to advance said first mentioned elongated flexible element and thereby move said part longitudinally of said arm.

15. A drive assembly comprising:
a foot actuated structure mounted to swing about an axis alternately in opposite directions, and including a pedal against which force is exerted by a user's foot to swing the structure about said axis;
a movable member to be driven by said structure;
mechanism for driving said member in response to oscillation of said foot actuated structure in said opposite directions about said axis;
means connecting said mechanism operatively to said structure for actuation thereby at a location offset from said axis, and mounted for shifting movement in a relation moving the operative connection between said structure and said mechanism toward and away from said axis to thereby vary the effective length of lever arm of said structure and correspondingly alter the transmission ratio of said drive assembly;
an elongated flexible element movable longitudinally and acting by such movement to shift said connecting means, and thereby said point of connection of said mechanism to said structure, toward or away from said axis;
a second of said foot actuated structures swinging oppositely from said first structure;
second connecting means connecting said mechanism to said second structure for actuation thereby and in a relation enabling shifting movement of the effective point of operative connection of said mechanism to said second structure toward and away from the axis about which second structure swings; and
an additional elongated flexible element movable longitudinally and acting by such movement to shift said second connecting means, and thereby its point of connection to said second structure, toward and away from the axis of the second structure.

16. A drive assembly as recited in claim 15, including common control means actuable by an operator to simultaneously shift both of said elongated flexible elements longitudinally and thereby shift the point of connection of said mechanism to both of said structures toward or away from the axes of said structures.

17. A drive assembly as recited in claim 16, in which said control means include a manually operated common control part mounted to turn about an axis and operable to simultaneously and in unison move said two elongated flexible elements longitudinally to shift said points of connection along said structures simultaneously.

18. A drive assembly comprising:
a foot actuated structure mounted to swing about an axis alternately in opposite directions, and including a pedal against which force is exerted by a user's foot to swing the structure about said axis;
a movable member to be driven by said structure;
mechanism for driving said member in response to oscillation of said foot actuated structure in said opposite directions about said axis;
means connecting said mechanism operatively to said structure for actuation thereby at a location offset from said axis, and mounted for shifting movement in a relation moving the operative connection between said structure and said mechanism toward and away from said axis to thereby vary the effective length of lever arm of said structure and correspondingly alter the transmission ration of said drive assembly;
a second of said foot actuated structures swinging oppositely from said first structure; and
second connecting means connecting said mechanism to said second structure for actuation thereby and in a relation enabling shifting movement of the effective point of operative connection of said mechanism to said second structure toward and away from the axis about which said second structure swings, said mechanism including two lengths of elongated flexible material connected adjustably to said two foot actuated structures respectively by said two connecting means and movable longitudinally in accordance with the swinging movement of said structures.

* * * * *